United States Patent
Otobe et al.

(10) Patent No.: US 7,653,240 B1
(45) Date of Patent: Jan. 26, 2010

(54) COLOR FILTER ARRAY AND METHOD

(75) Inventors: Masanori Otobe, Chiba (JP); Satoru Yamauchi, Ibaraki (JP); Shinri Inamori, Kawasaki (JP)

(73) Assignee: Texas Instruments Incorporated, Dallas, TX (US)

( * ) Notice: Subject to any disclaimer, the term of this patent is extended or adjusted under 35 U.S.C. 154(b) by 721 days.

(21) Appl. No.: 11/379,654

(22) Filed: Apr. 21, 2006

Related U.S. Application Data

(60) Provisional application No. 60/674,174, filed on Apr. 22, 2005.

(51) Int. Cl.
*G06K 9/00* (2006.01)
(52) U.S. Cl. .................. 382/162; 382/260; 382/264
(58) Field of Classification Search ................. 382/162, 382/176, 145, 190, 199, 300, 260, 264; 348/246, 348/141, 280, 273, 242, 607, E5.035, 250, 348/253, 625
See application file for complete search history.

(56) References Cited

U.S. PATENT DOCUMENTS

| | | | |
|---|---|---|---|
| 6,229,578 B1 * | 5/2001 | Acharya et al. | 348/607 |
| 6,507,364 B1 * | 1/2003 | Bishay et al. | 348/242 |
| 6,816,197 B2 * | 11/2004 | Keshet et al. | 348/273 |
| 7,151,747 B2 * | 12/2006 | Isoyama | 370/235 |
| 7,349,574 B1 * | 3/2008 | Sodini et al. | 382/168 |

\* cited by examiner

*Primary Examiner*—Anh Hong Do
(74) *Attorney, Agent, or Firm*—Mima Abyad; Wade J. Brady, III; Frederick J. Telecky, Jr.

(57) ABSTRACT

Color filter array demosaicing as is useful in digital cameras, still and video, using a single sensor includes blending of directional and non-directional interpolations. Directional interpolation uses edge detection with lowpass filtering with neighboring pixels for erroneous detection correction.

10 Claims, 19 Drawing Sheets

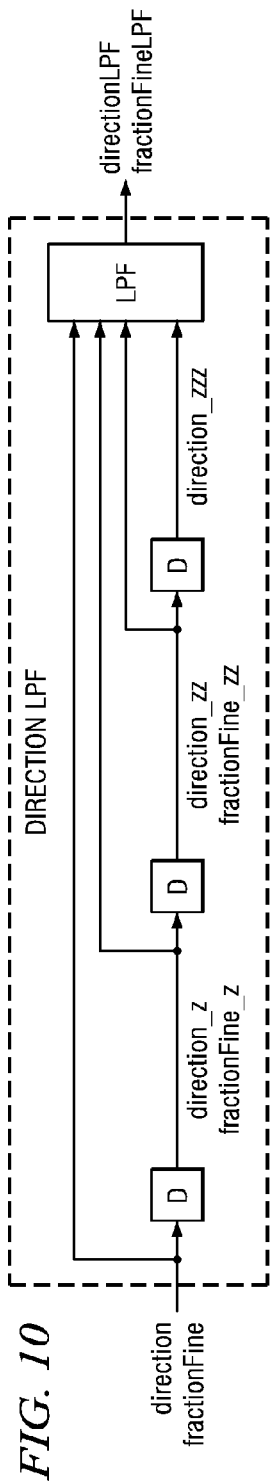
*FIG. 10*
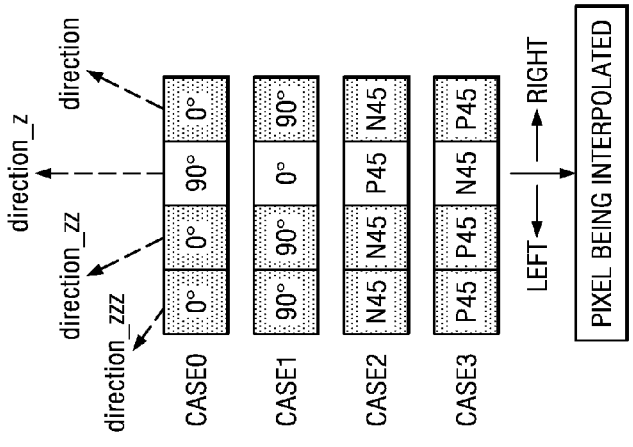
*FIG. 11*
*FIG. 12*

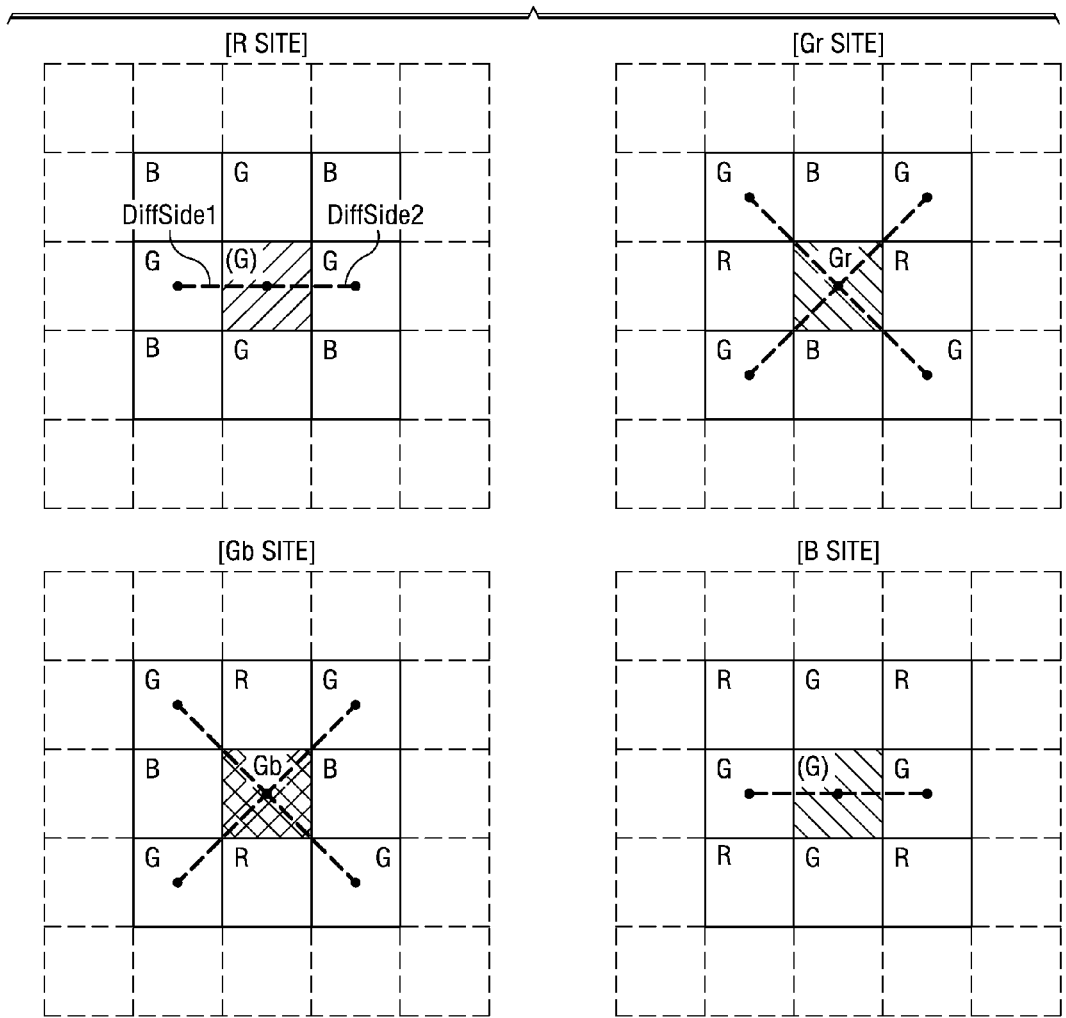

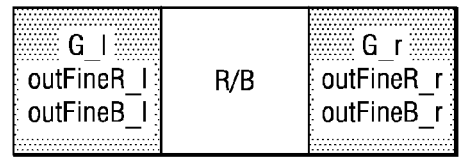
FIG. 30
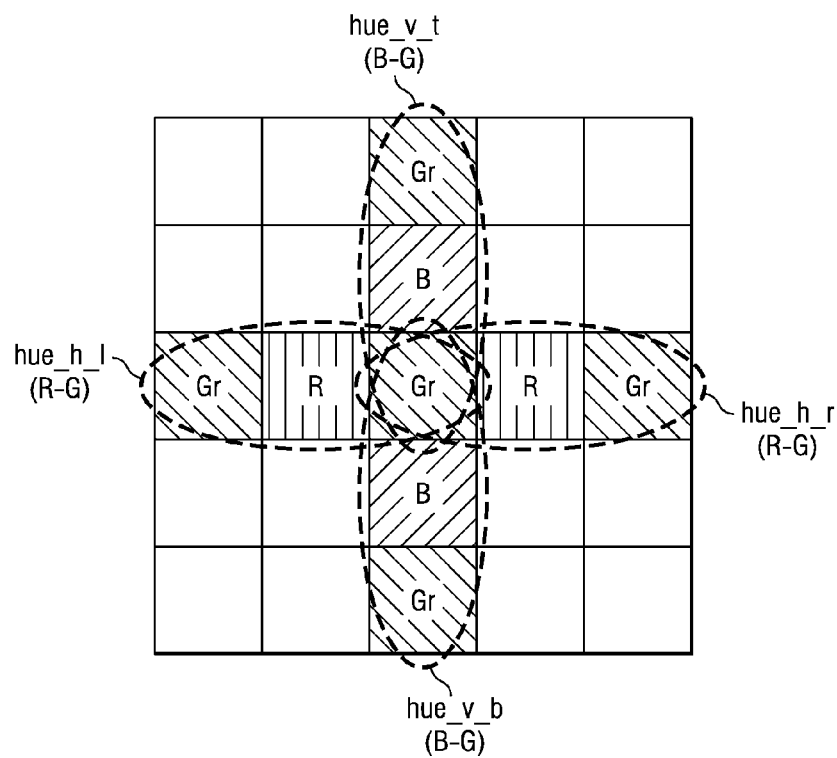
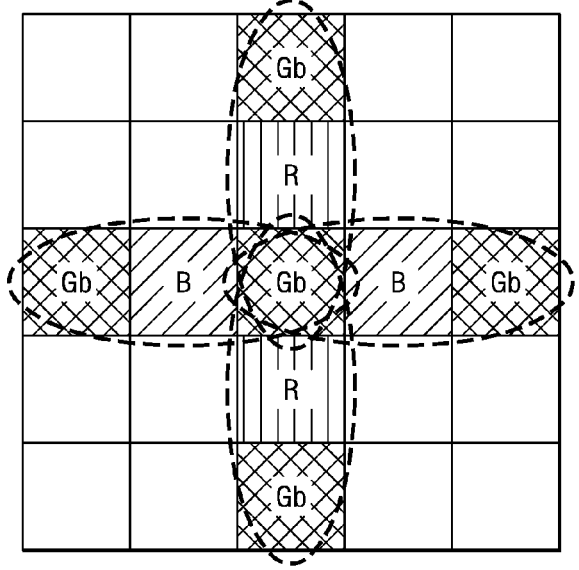
FIG. 31

COLOR FILTER ARRAY AND METHOD

CROSS-REFERENCE TO RELATED APPLICATIONS

This application claims priority from provisional application No. 60/674,174, filed Apr. 22, 2005.

BACKGROUND OF THE INVENTION

The present invention is related to digital image processing, and more particularly, digital still camera or digital video camera systems which employ a single image sensor with a color filter array.

In electronic color image systems, each image consists of a two-dimensional array of pixels and the full color of each pixel is represented by three color planes, usually red (R), green (G) and blue (B). Image light from a subject is converted to electric signals by a two dimensional array of photo-detectors, i.e., image sensor. To capture the information of the each color plane, three image sensors are used to detect light intensity of each color. But sometimes only one image sensor covered by a two-dimensional mosaic color filter array (CFA) is used for reducing cost, miniaturizing system, etc. The Bayer pattern is one of the commonly-used mosaic patterns for the CFA. FIG. 2a shows how red, green and blue filters are configured in the Bayer pattern. Gr is the green when the horizontal neighbor is red; and Gb is the green when the horizontal neighbor is blue.

In a system employing a CFA (e.g., FIG. 2d image pipeline for a digital camera), only one color data is obtained at each pixel site, though thee color values (R, G, and B in the Bayer case) at each pixel site are needed to represent the color of the subject. Then reproduction of the other missing colors from existing color data, i.e., demosaicing process, is required. But simply averaging neighboring colors to interpolate missing colors causes faulty colors at subject edges, et cetera. Much work has been performed to solve the problem (e.g., U.S. Pat. No. 5,506,619) but the results are unsatisfactory. Therefore, a good interpolation method is still lacking for high quality images.

SUMMARY OF THE INVENTION

The present invention provides demosaicing for a single sensor color filter array with interpolator blending directional and non-directional interpolations.

BRIEF DESCRIPTION OF THE DRAWINGS

FIG. 10 shows functional blocks of a directional lowpass filter.
FIG. 11 shows directions for pixels.
FIG. 12 illustrates an interpolation array.
FIG. 16 shows hue averaging.
FIGS. 17-19 illustrate example pixel arrangements.
FIGS. 20-24 show pixels involved in calculations.
FIG. 30 is a color configuration.
FIG. 31 shows pixels in red and blue calculations.

DESCRIPTION OF THE PREFERRED EMBODIMENTS

1. Overview

Figure 1:
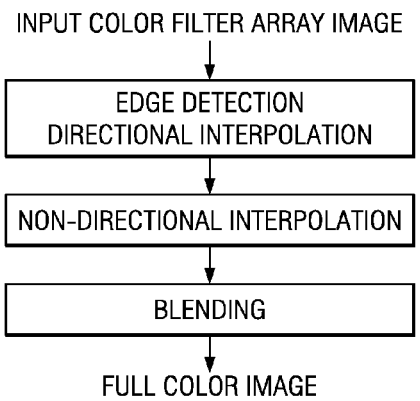
FIG. 1 is a flowchart for demosaicing.

Preferred embodiment methods of color filter array interpolation (demosaicing) include blending directional and non-directional interpolations; see FIG. 1 flowchart and FIGS. 3a-3i functional blocks detailing the directional and non-directional interpolations and blending.

Figure 2A:
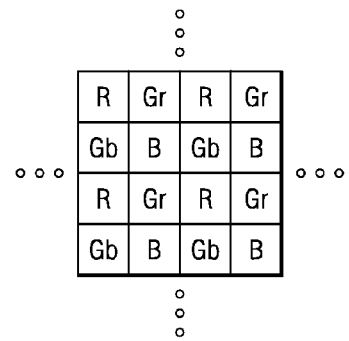
FIGS. 2a-2e show the Bayer mosaic pattern and generic image processing.
Figure 2B:

Preferred embodiment systems perform preferred embodiment methods with any of several types of hardware: digital signal processors (DSPs), general purpose programmable processors, application specific circuits, or systems on a chip (SoC) such as combinations of a DSP and a RISC processor together with various specialized programmable accelerators such as for FFTs and variable length coding (VLC). FIG. 2e illustrates a suitable processor. A stored program in an onboard or external (flash EEP) ROM or FRAM could implement the signal processing. Analog-to-digital converters and digital-to-analog converters can provide coupling to the real world, modulators and demodulators (plus antennas for air interfaces) can provide coupling for transmission waveforms, and packetizers can provide formats for transmission over networks such as the Internet.

2. Preferred Embodiment Functional Blocks

The preferred embodiments provide apparatus and methods for Demosaicing. FIG. 2b shows an example of a system targeted by the preferred embodiments. The image sensor block includes one image sensor and a CFA to convert the photonic image to an electronic signal. The image sensor is a charge-coupled device (CCD) or CMOS sensor. The pre-processing block executes gain and level control for each color, noise elimination, et cetera. The demosaicing block demosaics the CFA pattern and reproduces three color planes. The post-processing block executes color adjustment, gamma correction and color space conversion, edge enhancement, et cetera. The output image is used as input for image compression, a monitor display, et cetera.

Figure 2C:
Figure 2D:
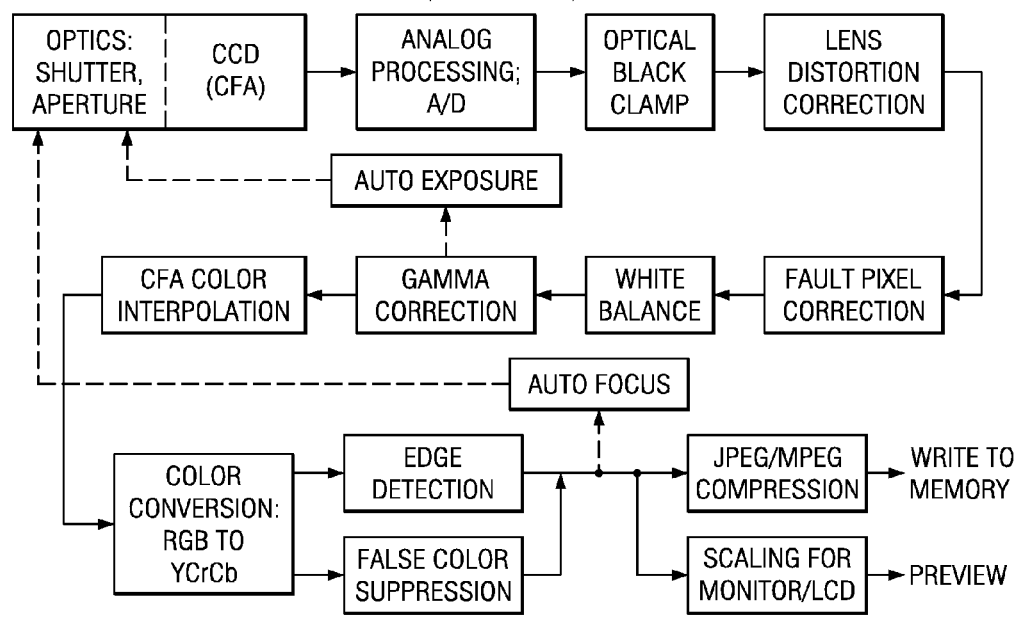
Figures 2E, 3A:
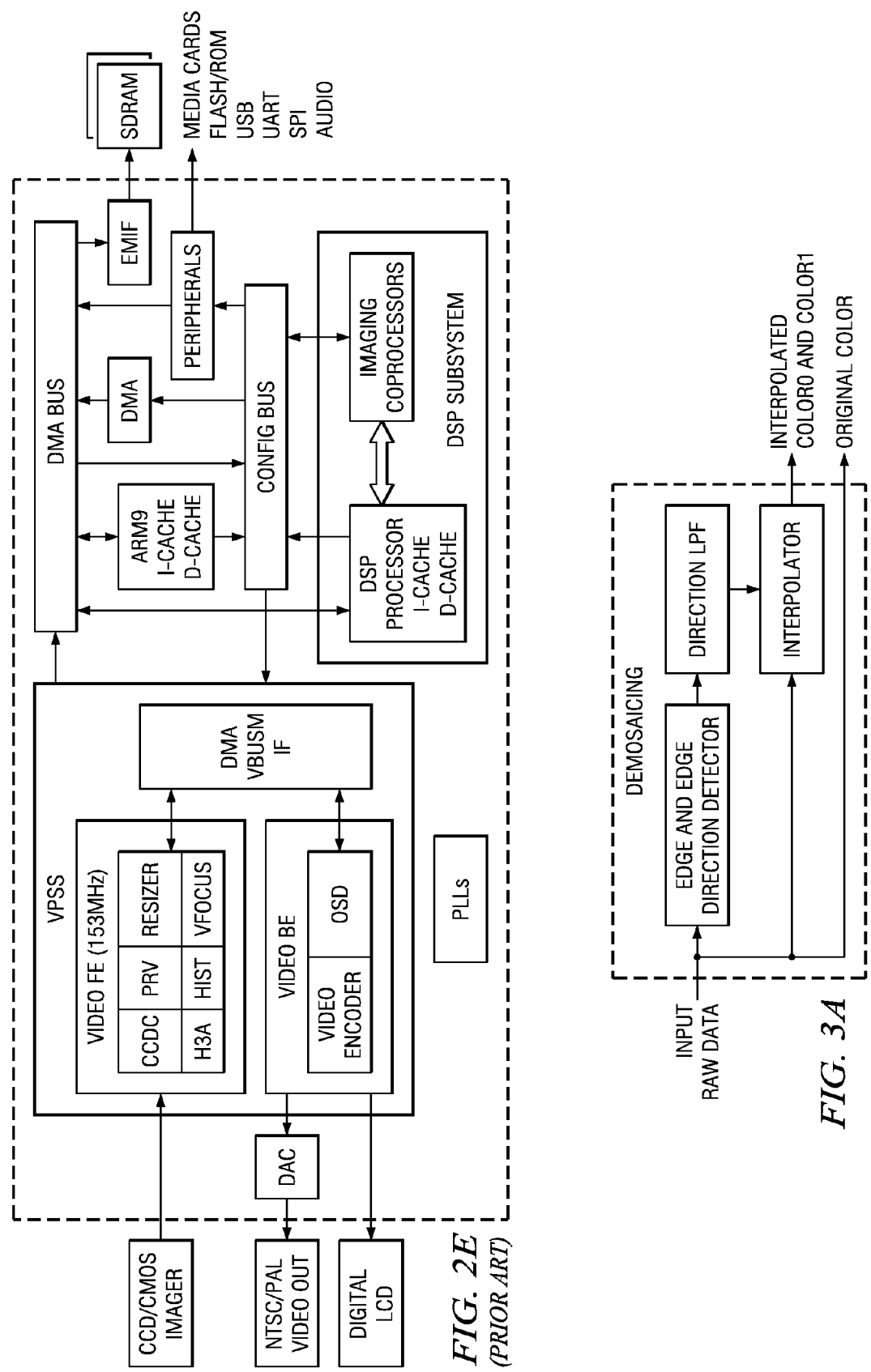
FIGS. 3a-3i illustrate functional blocks for demosaicing.

FIG. 2c shows another example of targeted systems. In this example, an image resizing block is added and two output images with different image sizes can be obtained simultaneously. The output of the resizing block can be only one. Each block in these examples can be realized by hardware or software on a processor or a combination.

FIGS. 3a-3i illustrates preferred embodiment demosaicing functional blocks which are briefly described in this section and with more detail in the following sections.

FIG. 3a shows a top level schematic diagram of a preferred embodiment demosaicing block. Input raw data comes from the pre-processing block into the demosaicing block. The edge and edge direction detector judges if the pixel being interpolated is around an edge of an object and detects the most probable direction of the edge. The direction low pass filter (LPF) detects a wrongly-detected direction and fixes it by low-pass-filtering the output of the direction detector. The interpolator calculates the two missing color values (color0 and color1) by interpolating input pixel data using the output of the direction LPF block. The original one color value per a pixel site (R, G or B per site) is also output to the next block (i.e., the post-processing block).

Figure 3B:
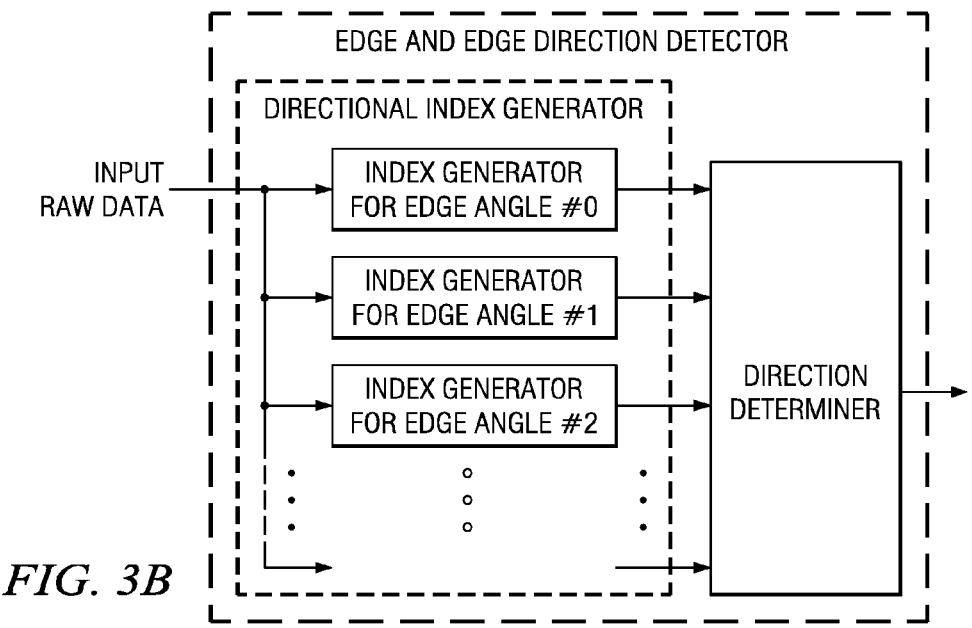

FIG. 3b shows a schematic diagram of the edge and edge direction detector. The directional index generator generates an index value for various edge angles. The direction determiner chooses the most probable direction using the output of the directional index generator. The directional index generator consists of an index generator for edge angle #0, one for edge angle #1, one for edge angle #2, and so forth.

Figure 3C:
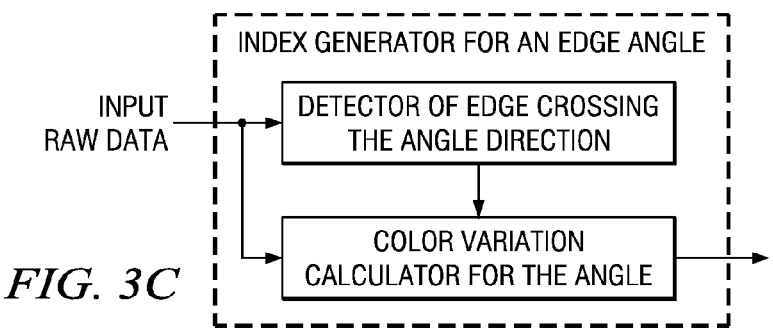

FIG. 3c shows a schematic diagram of the index generator for an edge angle, say the angle #0. The detector of edge crossing the angle direction detects an edge which is not parallel to the edge angle #0, e.g., an edge vertical to the edge angle #0. The color variation calculator for the angle computes the color difference in the direction of angle #0 using the output of the detector of edge crossing the angle direction and outputs the difference as the index for the edge angle #0. When there is an edge crossing the angle direction, the color difference is calculated from the pixels which stay on the side where the target pixel position is contained.

Figure 3D:
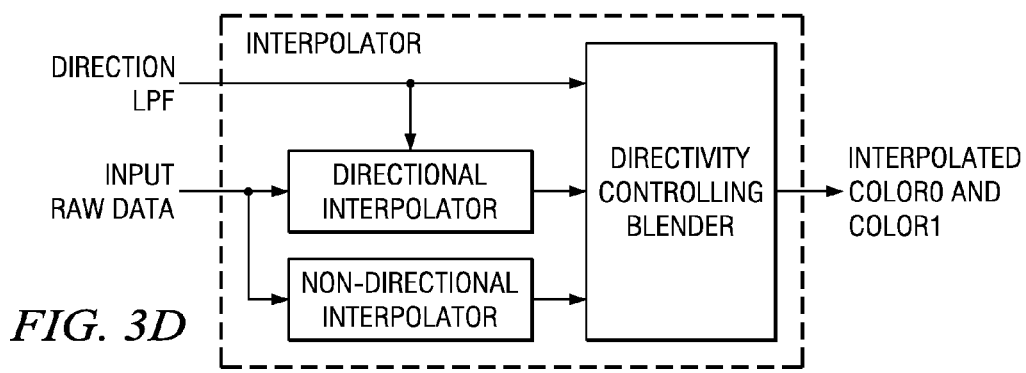

FIG. 3d shows a schematic diagram of the interpolator. The directional interpolator interpolates missing colors in the detected direction using the output of the direction LPF. The non-directional interpolator interpolates missing color from the surrounding pixel uniformly, which is used at fine pattern or uniform color areas. The directivity controlling blender controls strength of directivity by blending the output of the directional and non-directional interpolators.

Figure 3E:
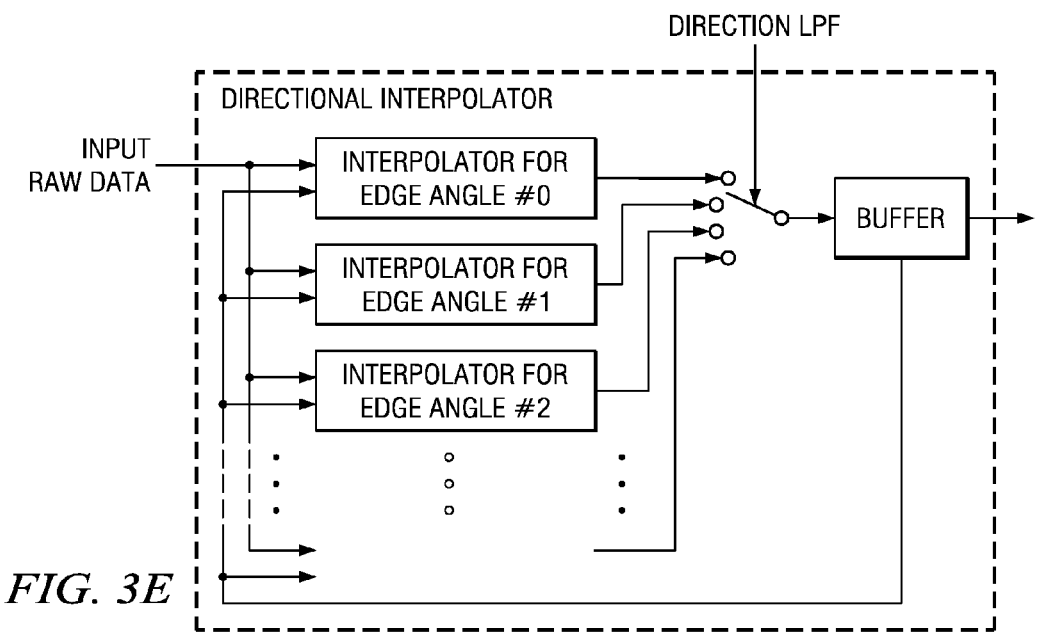

FIG. 3e shows a schematic of the directional interpolator. The directional interpolator consists of interpolators for the edge angle #0, one for #1, one for #2, and so forth. One of the interpolators is chosen by the detected direction. The buffer stores the chosen interpolated colors.

Figure 3H:
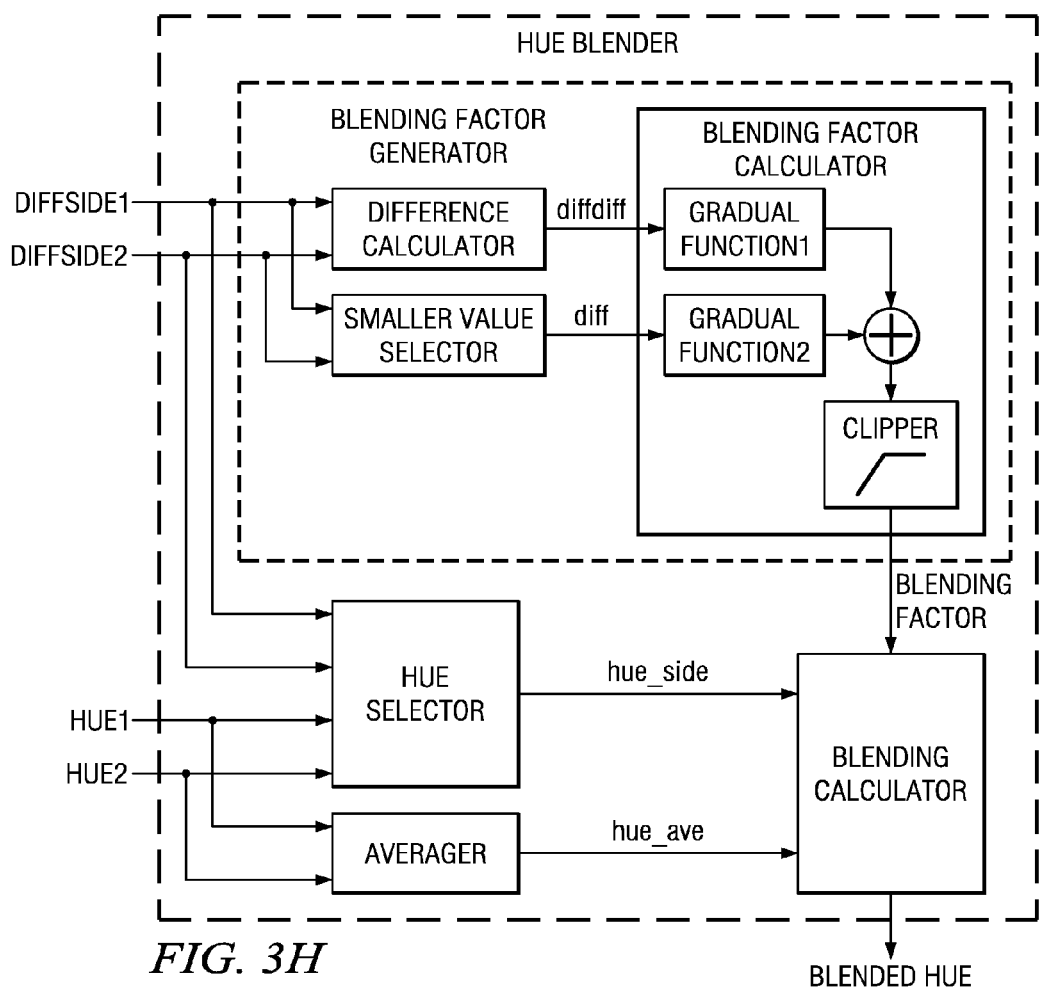
Figure 3F:
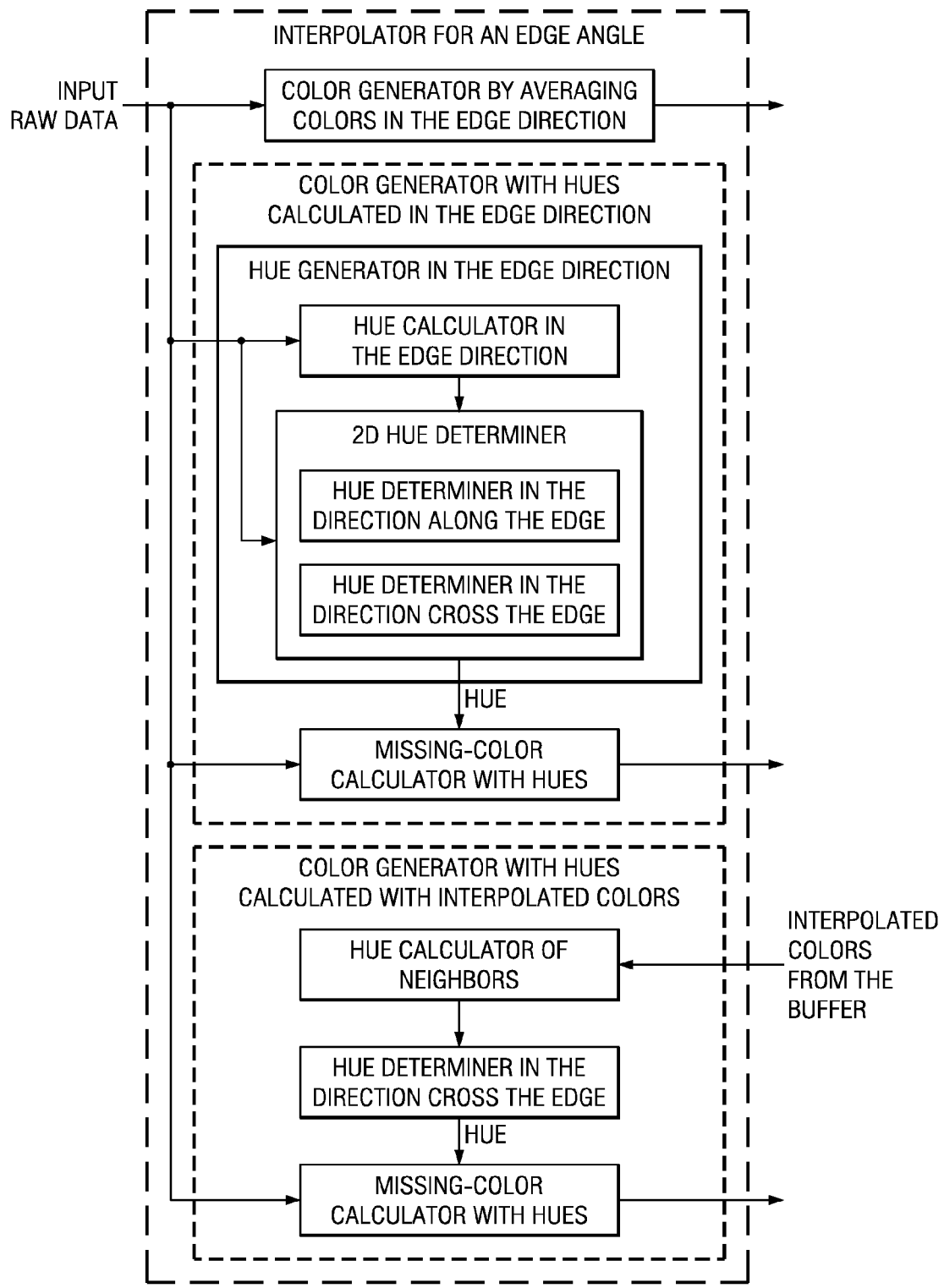

FIG. 3f shows a schematic of the interpolator for an edge angle, say the angle #0. Two of the three colors (R, G and B) need to be generated per pixel site. The interpolator has three types of color generators, i.e., a "color generator by averaging colors in the edge direction" (Generator#0), "color generator with hues calculated in the edge direction" (Generator#1), and "color generator with hues calculated with interpolated colors" (Generator#2). One or two types of the three generators are used for an angle.

Generator#0 averages color value in the input raw data in the direction #0 to interpolate a missing color.

Generator#1 consists of a hue generator in the edge direction and a missing color calculator with the hues that generates missing colors using the calculated hues. The hue generator in the edge direction, which calculates hues along the edge angle #0, consists of a "hue calculator in the edge direction" and a "two dimensional (2D) hue determiner". The hue calculator calculates hues at several positions or calculates hues using several combinations of pixel sites. The 2D hue determiner selects or blends the calculated hues two-dimensionally. The determiner keeps or enhances edge sharpness and avoids faulty color. The 2D hue determiner consists of hue determiners in the direction along the edge and cross the edge.

Generator#2 consists of a hue calculator of neighbors, hue determiner in the direction cross the edge, and missing-color calculator with hues. The hue calculator of neighbors calculates hues at neighbor pixel using interpolated colors at the neighbors. The interpolated colors are stored in the buffer.

Figure 3G:
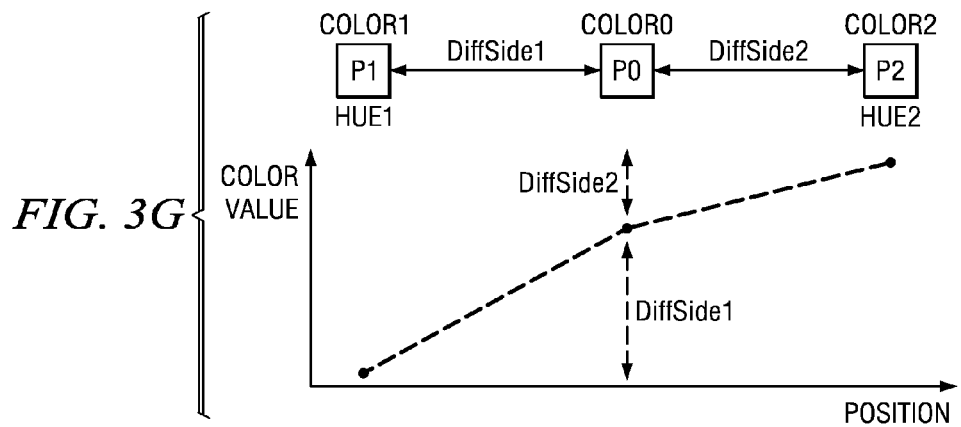

Some of the hue determiners contain a hue blender. FIG. 3g shows pixel configuration and input data for the hue blender. The pixel p0 is the pixel being interpolated. The pixels p1 and p2 are neighbors of p0 and on opposite sides. Color values at p0, p1, and p2 are "Color0", "Color1", and "Color2", respectively. Hues at p1 and p2 are "Hue1" and "Hue2", respectively. Hue1 and Hue2 are blended and used to generate missing color at p0. "DiffSide1" and "DiffSide2" is the color-difference between p0 and p1 and between p0 and p2, respectively, i.e., $$DiffSide1 = |Color0 - Color1|$$

$$DiffSide2 = |Color0 - Color2|.$$

Hue1, Hue2, DiffSide1 and DiffSide2 are the inputs of the hue blender.

FIG. 3h shows a schematic diagram of the hue blender. The hue selector selects a hue based on DiffSide1 and DiffSide2 and outputs it as "hue_side". The averager averages Hue1 and Hue2 and outputs as "hue_ave". The blending calculator blends "hue_side" and "hue_ave" with the blending factor calculated by the blending factor generator. The blending factor generator consists of a difference calculator, smaller value selector, and blending factor calculator. The difference calculator generates difference between DiffSide1 and DiffSide2 and outputs it as "diffdiff". The smaller value selector selects the smaller value of DiffSide1 and DiffSide2 and outputs it as "diff". The blending factor calculator uses "diffdiff" and "diff" to yield the blending factor. The gradual function 1 and 2 convert "diffdiff" and "diff" into blending factors, respectively. The converted blending factors are added up and the clipper clips the maximum value of the added factor to 100%.

Figure 3I:
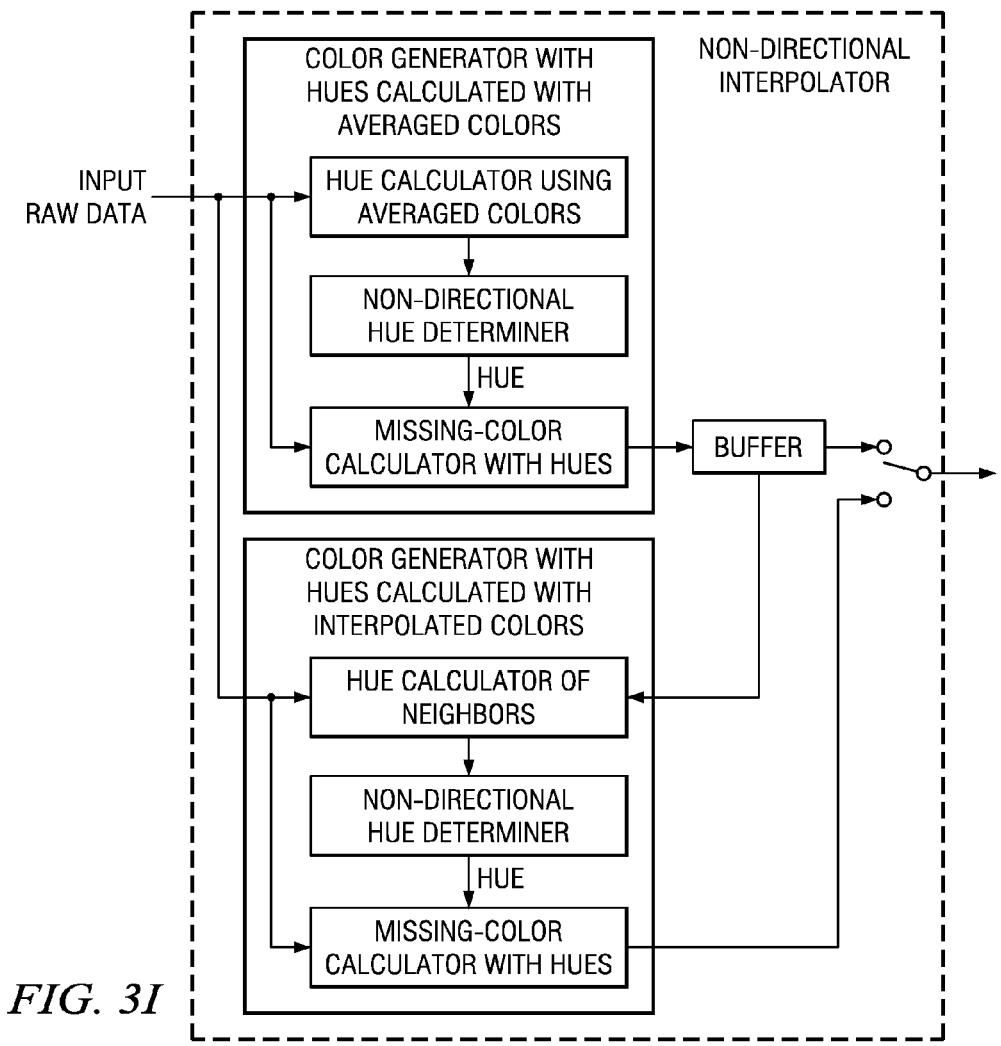

FIG. 3i shows a schematic diagram of the non-directional interpolator. The non-directional interpolator consists of color generators with hues calculated with averaged colors and interpolated colors and a buffer. One of the two color generators is used for a pixel site.

The color generator with hues calculated with averaged colors works as follows. The "hue calculator using averaged colors" calculates hues non-directionally at neighbor pixels using averaged colors. The "non-directional hue determiner" decides hue non-directionally. The "missing-color calculator with hues" calculates missing colors using the input color at the site and the output of the hue determiner.

The buffer stores the interpolated colors.

In the "color generator with hues calculated with interpolated colors", the "hue calculator of neighbors" calculates hues at neighbors using input data and interpolated colors stored in the buffer.

3. Preferred Embodiment Details

This section provides more detailed description of and operation of the functional blocks of preceding section 2; namely, subsection A: Edge and edge-direction detector, subsection B: Direction lowpass filter, and subsection C: Interpolator.

The Bayer color data are assumed. In the present embodiment, a 5×5 pixel neighborhood is used for the demosaicing. FIGS. 4a-4d show the four cases that need to be considered according to the pixel type at the center position of a 5×5 neighborhood; namely, FIG. 4a: R site, FIG. 4b: Gr site, FIG. 4c: Gb site, and FIG. 4d: B site.

Figures 4A, 4B, 4C, 4D, 5, 6:
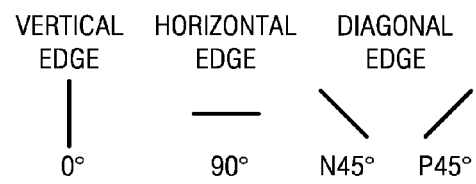
FIGS. 4a-4d show the four pixel types in a Bayer pattern.
FIG. 5 shows edge directions.
FIG. 6 shows pixel labels.

In the following description, the four edge directions are denoted 0°, 90°, N45°, and P45° as shown in FIG. 5.

In some of the interpolation process, hues are used. With the Bayer CFA pattern, green is used for luminance value and differences between G and R (i.e., G-R or R-G) and G and B (i.e., G-B or B-G) are used for hues.

Refer to the pseudo code below for detailed operation.

A. Edge & edge direction detector

A four angle case is described. The 5×5 pixel neighbor shown in FIG. 6 is used for the edge and direction detector, where d[0][0]~d[4][4] represent pixel data values at each pixel site. [2][2] is the pixel location where the missing colors are being interpolated.

A.1 Directional index generator

Figure 7A:
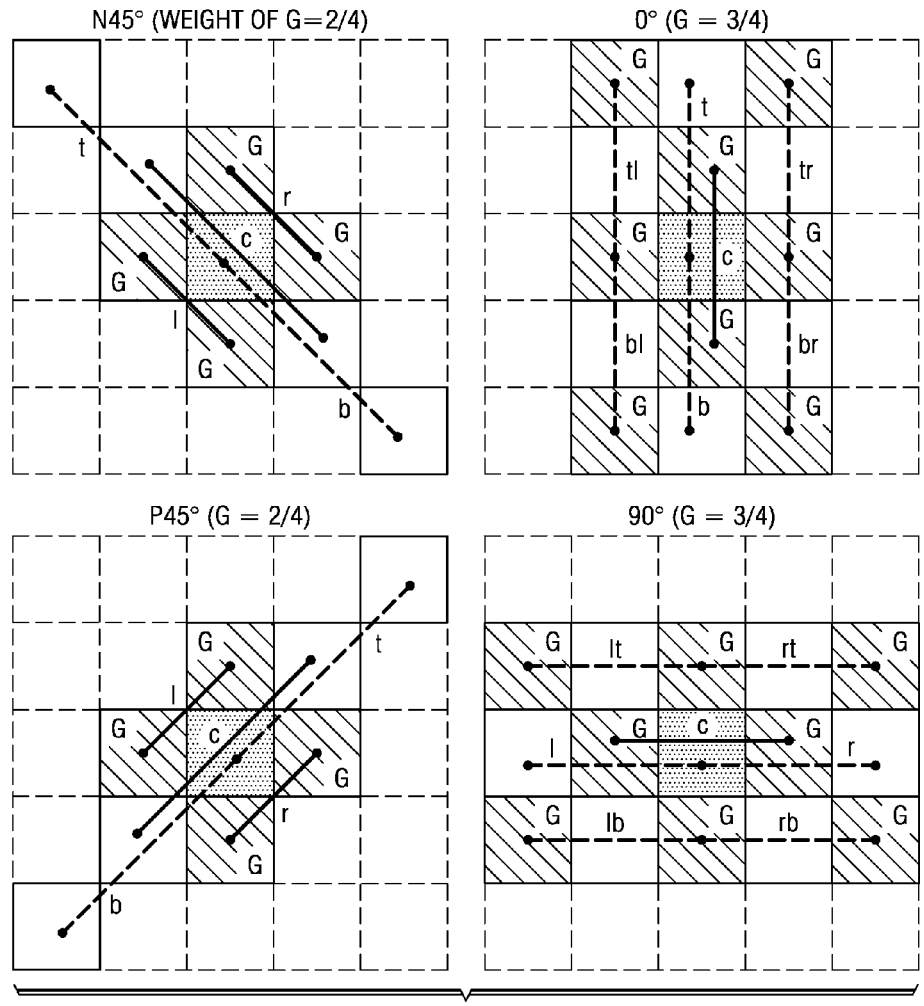
FIGS. 7a-7b illustrate pixels used in direction generators.
Figure 7B:
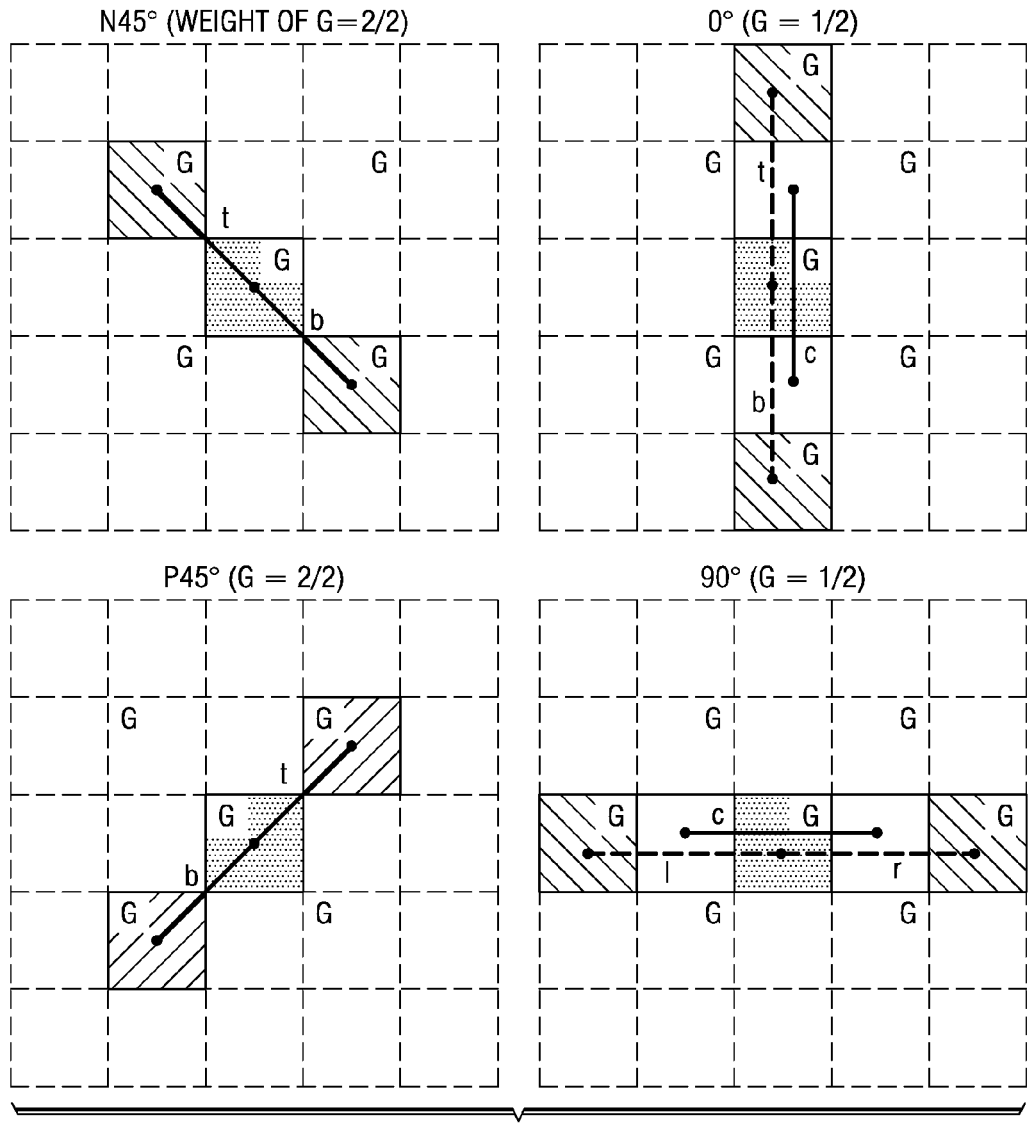

The directional index generator consists of index generators for the edge angle 0°, 90°, N45°, and P45°. The FIGS. 7a-7b illustrates which pixels are used for every generator when the pixel site being interpolated are "R or B" site and "Gr or Gb" site, respectively. The letters in the circle corresponds to the suffixes in the following code. The bold lines represent absolute value of subtraction. The dotted lines also represents absolute value of subtraction but used under a condition. At R or B sites, more sites are used than at Gr or Gb sites to be the "weight of G">50%.

In the following code, outputs of the color variation calculator for the angle 0°, 90°, N45°, and P45° are diff[1], [3], [0], [2], respectively the weight of the value in the diff calculated from green is indicated in FIGS. 7a-7b.

A.1.1 Index generator for edge angle 0°

$diff\_0\_t=|d[0][2]-d[2][2]|$ $diff\_0\_c=|d[1][2]-d[3][2]|$ $diff\_0\_b=|d[2][2]-d[4][2]|$ $diff\_0\_tl=|d[0][1]-d[2][1]|$ $diff\_0\_tr=|d[0][3]-d[2][3]|$ $diff\_0\_bl=|d[2][1]-d[4][1]|$ $diff\_0\_br=|d[2][3]-d[4][3]|$ A.1.1.1 Detector of edge crossing the angle direction (0°)

When diff_0_t is smaller than diff_0_b, the value of the center pixel [2][2] is closer to that of the upper pixel [0][2] than that of the lower pixel [4][2] and there might be an edge between [2][2] and [4][2].

When diff_0_t is larger than diff_0_b, the value of the center pixel [2][2] is closer to that of the lower pixel [4][2] than that of the upper pixel [0][2] and there might be an edge between [2][2] and [0][2].

if (diff_0_t<diff_0_b)
    is_dir_0_t=true
  else
    is_dir_0_t=false

A.1.1.2 Color variation calculator for the angle (0°)

When is_dir_0_t is true, there might be an edge between [2][2] and [4][2]. Therefore, only the upper 4 rows are used for the color variation calculation.

When is_dir_0_t is false, there might be an edge between [2][2] and [0][2]. Therefore, only the lower 4 rows are used for this calculation.

This calculator calculates value difference between the same color sites in the direction 0°. When the difference, diff[1], is large, there are edges crossing the direction 0°.

Figure 8A:
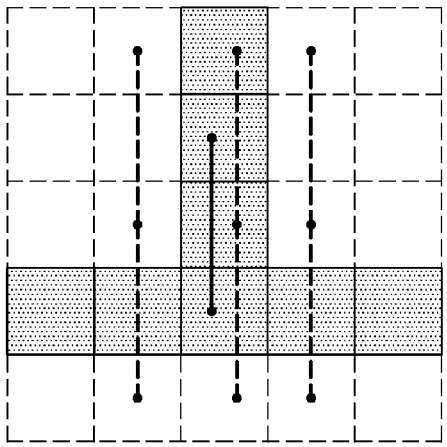
FIGS. 8a-8b show pixels for the 0-degree edge detector.

FIG. 8a explains how the is_dir_0_t flag works. The figure shows a pattern in which the 0° edge should be detected for the center pixel because the upper and lower neighbor pixels have the same color value. If only the upper 4 rows are used, i.e., only diff_0_t, diff_0_c, diff_0_tl and diff_0_tr are taken into account, the calculator generates small difference for 0°.

Figure 8B:
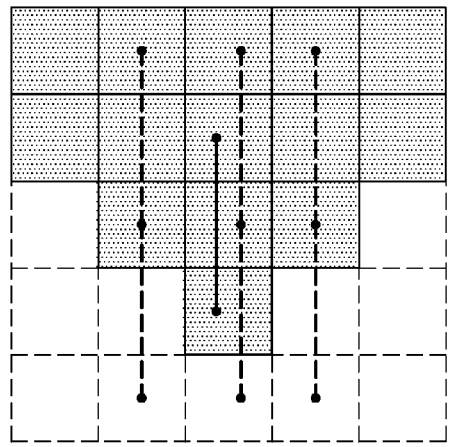

FIG. 8b also shows a pattern in which 0° edge should be detected for the center pixel. All 8 pixels used to calculate "diff"s from the upper 4 rows (diff_0_t, diff_0_c, diff_0tl and diff_0_tr) have the same color value and the calculator generates a small difference for 0°.

A.1.1.2.1 At R or B sites
  if (is_dir_0_t=true)

$diff[1]=(diff\_0\_c+diff\_0\_tl+diff_{13}0\_t+diff\_0\_tr)/2$ else $diff[1]=(diff\_0\_c+diff\_0\_bl+diff\_0\_b+diff\_0\_br)/2$ A.1.1.2.2 At Gr or Gb sites
  if (is_dir_0_t=true)

$diff[1]=diff\_0\_c+diff\_0\_t$ else $diff[1]=diff\_0\_c+diff\_0\_b$

A.1.2 Index generator for edge angle 90°

Processing is done in an analogous manner to the index generator for edge angle 0° and computes diff[3].

$diff\_90\_l=|d[2][0]-d[2][2]|$ $diff\_90\_c=|d[2][1]-d[2][3]|$ $diff\_90\_r=|d[2][2]-d[2][4]|$ $diff\_90\_lt=|d[1][0]-d[1][2]|$ $diff\_90\_lb=|d[3][0]-d[3][2]|$ $diff\_90\_rt=|d[1][2]-d[1][4]|$ $diff\_90\_rb=|d[3][2]-d[3][4]|$ A.1.2.1 Detector of edge crossing the angle direction (90°)
  if (diff_90_l<diff_90_r)
    is_dir_90_l=true
  else
    is_dir_90_l=false A.1.2.2 Color variation calculator for the angle (90°)

A.1.2.2.1 At R or B sites
  if (is_dir_90_l=true)

$diff[3]=(diff\_90\_c+diff\_90\_lt+diff\_90\_l+diff\_90\_lb)/2$ else $diff[3]=(diff\_90\_c+diff\_90\_rt+diff\_90\_r+diff\_90\_rb)/2$ A.1.2.2.2 At Gr or Gb sites
  if (is_dir_90_l=true)

$diff[3]=diff\_90\_c+diff\_90\_l$ else $diff[3]=diff\_90\_c+diff\_90\_r$

A.1.3 Index generator for edge angle N45°

Processing is done in an analogous manner to the index generator for edge angle 0° and computes diff[0].

$diff\_n45rb\_t=|d[0][0]-d[2][2]|$ $diff\_n45rb\_c=|d[1][1]-d[3][3]|$ $diff\_n45rb\_b=|d[2][2]-d[4][4]|$ $diff\_n45rb\_l=|d[2][1]-d[3][2]|$ $diff\_n45rb\_r=|d[1][2]-d[2][3]|$ A.1.3.1 Detector of edge crossing the angle direction (N45°)
  if (diff_n45rb_t<diff_n45rb_b)
  is_dir_n45_t=true
  else
  is_dir_n45_t=false A.1.3.2 Color variation calculator for the angle (N45°)

A.1.3.2.1 At R or B sites
  if (is_dir_n45_t=true)

$diff[0]=diff\_n45rb\_c+diff\_n45rb\_t+diff\_n45rb\_l+diff\_n45rb\_r$ else $diff[0]=diff\_n45rb\_c+diff\_n45rb\_b+diff\_n45rb\_l+diff\_n45rb\_r$ A.1.3.2.2 At Gr or Gb sites $diff\_n45g\_t=|d[1][1]-d[2][2]|$ $diff\_n45g\_b=|d[2][2]-d[3][3]|$ $diff[0]=diff\_n45g\_t+diff\_n45g\_b$ A.1.4 Index generator for edge angle P45°

Processing is done in an analogous manner to the index generator for edge angle 0° and computes diff[2].

$diff\_p45rb\_t=|d[0][4]-d[2][2]|$ $diff\_p45rb\_c=|d[1][3]-d[3][1]|$ $diff\_p45rb\_b=|d[2][2]-d[4][0]|$ $diff\_p45rb\_l=|d[1][2]-d[2][1]|$ $diff\_p45rb\_r=|d[2][3]-d[3][2]|$ A.1.4.1 Detector of edge crossing the angle direction (P45°)
  if (diff_p45rb_t<diff_p45rb_b)
  is_dir_p45_t=true
  else
  is_dir_p45_t=false A.1.4.2 Color variation calculator for the angle (P45°)

A.1.4.2.1 At R or B sites
  if (is_dir_p45_t=true)

$diff[2]=diff\_p45rb\_c+diff\_p45rb\_t+diff\_p45rb\_l+diff\_p45rb\_r$ else $diff[2]=diff\_p45rb\_c+diff\_p45rb\_b+diff\_p45rb\_l+diff\_p45rb\_r$ A.1.4.2.2 At Gr or Gb sites $diff\_p45g\_t=|d[1][3]-d[2][2]|$ $diff\_p45g\_b=|d[2][2]-d[3][1]|$ $diff[2]=diff\_p45g\_t+diff\_p45g\_b;$ A.2 Direction determiner When output of a color variation calculator for an angle is large, there is an edge which is NOT parallel to the angle. Therefore, the angle having the smallest output is the most probable direction of an edge.

$diffD[0]=diff[0]+deltaN45$ $diffD[1]=diff[1]+delta0$ $diffD[2]=diff[2]+deltaP45$ $diffD[3]=diff[3]+delta90$ where deltaN45, delta0, deltaP45 and delta90 are constants to adjust priority order among the directions. These constants can be set to 0 if the priority adjustment is not required.

$diffMin$=minimum-value of $diffD[0]$, $diffD[1]$, $diffD[2]$ and $diffD[3]$ if (diffMin=diffD[1])
  direction=0°
  else if (diffMin=diffD[3])
  direction=90°
  else if (diffMin=diffD[0])
  direction=N45°
  else
  direction=P45°

Figure 9:
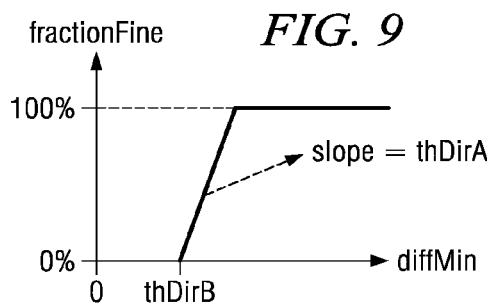
FIG. 9 is a graph of a non-linear function for saturation.

The probability that the determined direction is wrong or clear edges do not exist is represented by "fractionFine". The value of fractionFine is calculated from diffMin by the piecewise linear function illustrated in FIG. 9, where thDirA and thDirB are parameter coefficients to control the function as slope and intercept, respectively. The values thDirA=16 and thDirB=8 work well for 8-bit logic; i.e., the maximum value of diffMin=255 and 100% for fractionFine=255. The next subsection makes the adjustment for the case of high probability of a wrong direction or no edge.

B. Direction LPF

The horizontal 4-tap filter case is described in this subsection. FIG. 10 shows a schematic diagram of the direction LPF. "D" represents a horizontal one-pixel delay tap, and "direction_z" is the direction (0°, 90°, N45°, or P45°) of the pixel being interpolated. When processing is performed from the left to right pixels horizontally, "direction" and "direction_zz" are the values of the right and left neighbors, respectively; "directionLPF" is the low-pass-filtered "direction"; and "fractionFineLPF", is also output of the direction LPF block.

The "direction_z" is flipped in the four cases illustrated in FIG. 11. In these cases, the "direction_z" is wrongly determined because these edge configurations are impossible. Therefore, the direction of the horizontal neighbor is used as the output "directionLPF"; i.e., the direction is rotated 90°. In other cases, directionLPF=direction_z. The color sites of "direction" and "direction_zz" are the same and different from that of "direction_zzz". Therefore, using "direction_zzz" in addition to the nearest neighbors ("direction_zz" and "direction"), i.e., using information from two different color sites, increases probability that the "direction_z" is wrong.

When the direction is flipped, averaged "fractionFine" values of left and right neighbor is used for "fractionFineLPF".

fractionFineAve=(fractionFine_zz+fractionFine)/2 if ((direction_zzz=direction_zz) AND (direction_zz=direction)) {
    if ((direction=0°) AND (direction_z=90°)) {

```
    directionLPF=0°
    fractionFineLPF=fractionFineAve
} else if ((direction=90°) AND (direction_z=0°)) {
    directionLPF=90°
    fractionFineLPF=fractionFineAve
} else if ((direction=N45°) && (direction_z=P45°)) {
    directionLPF=N45°
    fractionFineLPF=fractionFineAve
} else if ((direction=P45°) && (direction_z=N45°)) {
    directionLPF=P45°
    fractionFineLPF=fraction FineAve
} else { //no flipping
    directionLPF=direction_z
    fractionFineLPF=fractionFine_z
  }
} else { //direction_zz ≠direction
    directionLPF=direction_z
    fractionFineLPF=fractionFine_z
  }
```

C. Interpolator

A four angle (0°, 90°, N45°, and P45°) case is described. The FIG. 12 5×5 pixel neighbor is used for the interpolator, where i[0][0]~i[4][4] represent pixel data values at each pixel site. [2][2] is the pixel location where the missing colors are being interpolated. Notation different from that for the edge and direction detector is used because delay taps exist in the direction LPF.

Several calculations are expressed here to simplify the code in the following sections.

The following calculation is performed to obtain hues around the center pixel by obtain missing color by averaging two pixels vertically or horizontally.

//hue calculation from vertical averaging $$hue\_v\_t = i[1][2] - (i[0][2] + i[2][2])//2$$

$$hue\_v\_l = i[2][1] - (i[1][1] + i[3][1])/2$$

$$hue\_v\_r = i[2][3] - (i[1][3] + i[3][3])//2$$

$$hue\_v\_b = i[3][2] - (i[2][2] + i[4][2])//2$$

//hue calculation from horizontal averaging $$hue\_h\_t = i[1][2] - (i[1][1] + i[1][3])/2$$

$$hue\_h\_l = i[2][1] - (i[2][0] + i[2][2])/2$$

$$hue\_h\_r = i[2][3] - (i[2][2] + i[2][4])/2$$

$$hue\_h\_b = i[3][2] - (i[3][1] + i[3][3])/2$$

Figure 13:
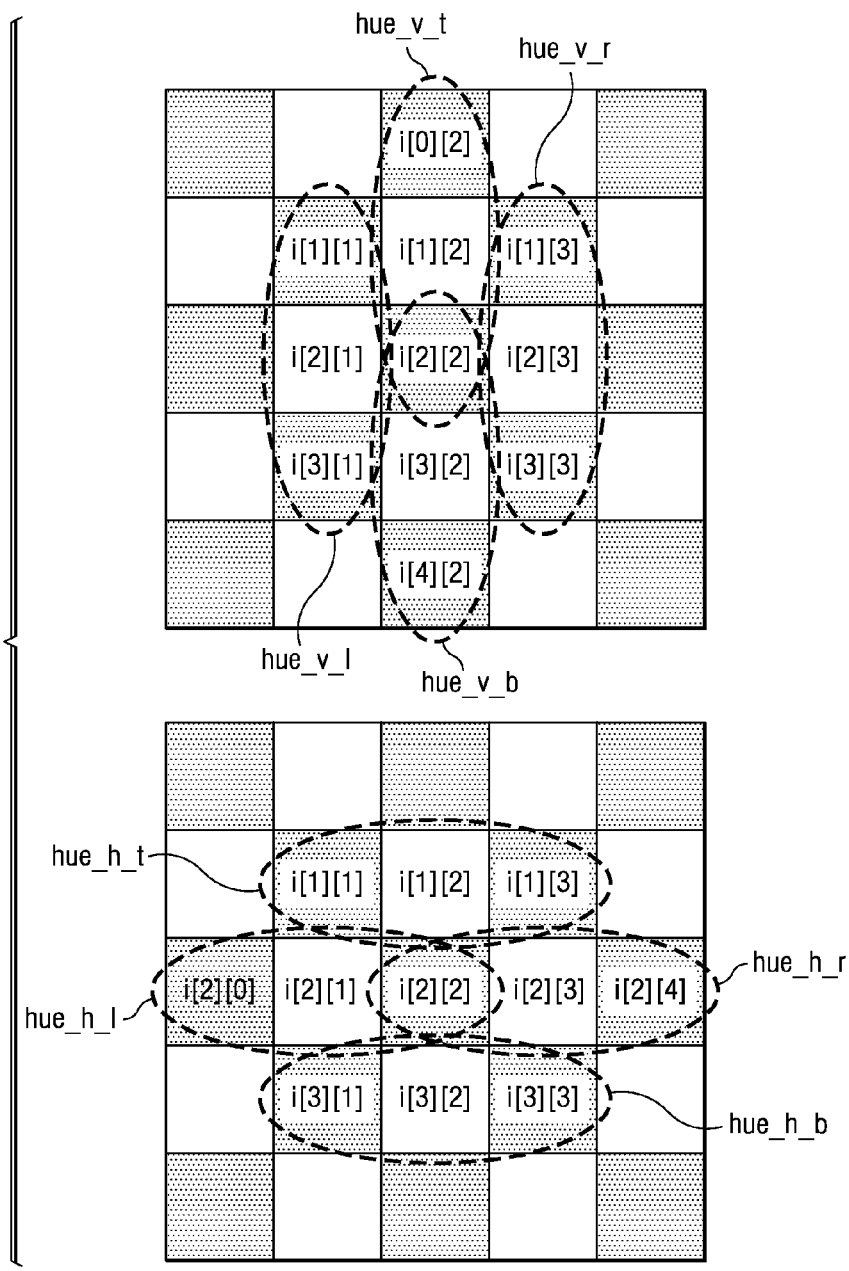
FIG. 13 shows pixels used in hue computations.

FIG. 13 illustrates the pixels used for the hue calculation. Green pixels are shaded at Gr or Gb sites and white at R or B sites. These hues are used in the following several interpolators.

C.1 Directional interpolator

The outputs of the directional interpolator are interpolated R (outDirR), interpolated G (outDirG), and interpolated B (outDirB); two of the three colors are output for a pixel site because one of the three colors does not need to be interpolated or generated.

C.1.1 Hue blender

The directional interpolator has several hue blenders. The "fractionAve" in the following code is the blending factor. When fractionAve=100%, the averaged hue (hue_ave) is output. When fractionAve=0%, hue_side is output.

C.1.1.1 Difference calculator $$diffdiff = |DiffSide1 - DiffSide2|$$

C.1.1.2 Smaller value selector diff=smaller_value of "DiffSide1" and "DiffSide2"

When DiffSide1<DiffSide2, Color1 is closer to Color0 than Color2 is, and vice-versa. Then the hue of the side having closer color is used in the blending calculator. Therefore, the smaller color-difference (DiffSide1 or DiffSide2) is chosen.

C.1.1.3 Blending factor calculator

The outputs of the piecewise-linear gradual function1 and the piecewise-linear gradual function2 are "fractionAve1" and "fractionAve2". The "fractionAve1" and "fractionAve2" are added-up and output as "fractionAve" after clipping to a maximum value of 100%. Because adding-up is used, the fraction of hue_ave in the output increases when fractionAve1 "OR" fractionAve2 gets larger.

C.1.1.3.1 Gradual function1

Figure 14:
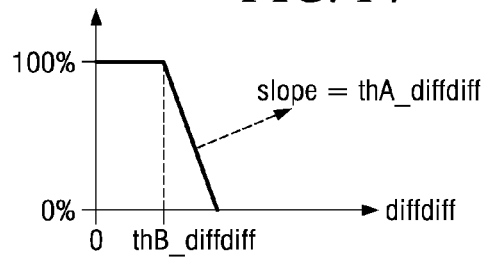
FIGS. 14-15 are graphs of saturation functions.

The output fractionAve1 is calculated from "diffdiff" using the piecewise linear function illustrated in FIG. 14, where thA_diffdiff and thB_diffdiff are the parameter coefficients to control the function as slope and intercept, respectively. When the difference (diffdiff) of the two color-differences (DiffSide1 and DiffSide2) is large, Color0 is much closer to one of Color1 or Color2. Therefore, fractionAve1 gets smaller and the hue of the side having closer color is output. In the other case, Color1 and Color2 are closer to each other or similarly away from Color0, and the averaged hue (hue_ave) is output.

C.1.1.3.2 Gradual function2

Figure 15:
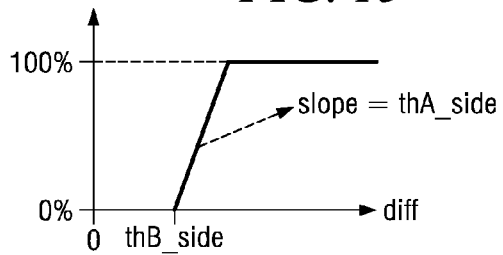

The output fractionAve2 is calculated from "diff" using a piecewise linear function illustrated in FIG. 15, where thA_side and thB_side are the parameter coefficients to control the function as slope and intercept, respectively. When the smaller-color-differences (diff) is large, both Color1 "AND" Color2 are away from Color0. Therefore, fractionAve2 gets larger and the averaged hue (hue_ave) is output.

C.1.1.4 Hue selector

The hue selector chooses the hue of the side having the smaller color-difference, i.e., the hue having the color closer to Color0.

```
if (DiffSide1<DiffSide2)
    hue_side=Hue1
else
    hue_side=Hue2
```

C.1.1.5 Averager $$hue\_ave = (Hue1 + Hue2)/2$$

C.1.1.6 Blending calculator

The blending calculator blends hue_side and hue_ave as follows;

Blended hue=hue_side*(100−fraction Ave)/100+ hue_ave*fractionAve/100 where the unit of the fractionAve is %. Note for edge angle 0° the Blended hue output is named blended_0, for edge angle 90° the output is blended_90, for edge angle N45° there are four blenders with outputs blended_n45_h, blended_n45_v, outDirGR, outDirGB, and for edge angle P45° again there are four blenders and outputs blended_p45_h, blended_p45_v, outDirGR, outDirGB.

C.1.2 Interpolator for edge angle 0°

The "color generator by averaging colors in the edge direction" and the "color generator with hues calculated in the edge direction" operate for the angle 0° as follows.

C.1.2.1 Color generator by averaging colors in the edge direction (0°)

The missing color is generated by averaging the upper and lower pixel values as follows and the result (ave_0_c) is used as one of the two interpolated colors.

$$ave\_0\_c=(i[1][2]+i[3][2])/2$$

Figures 16, 17:
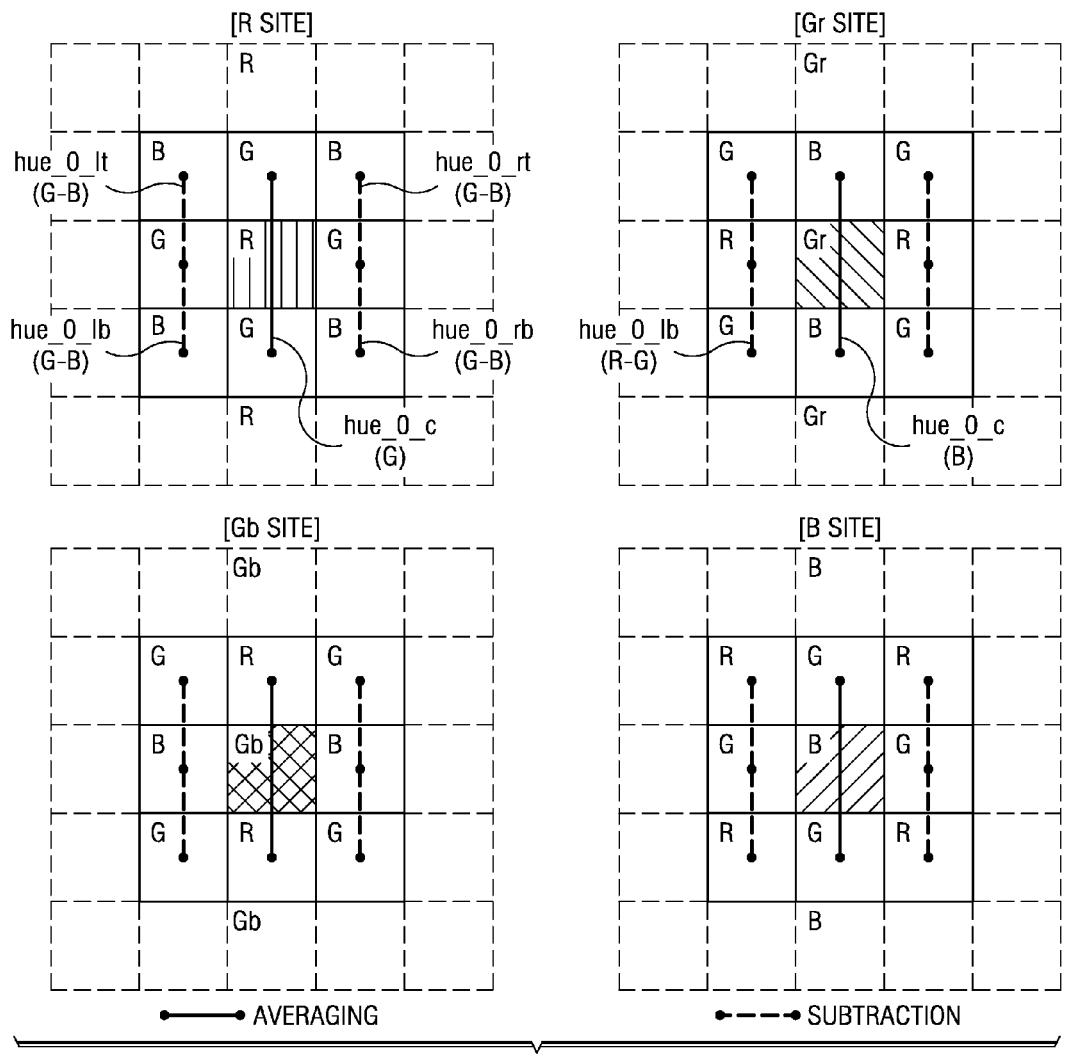

At R sites: outDirG=ave_0_c
At Gr sites: outDirB=ave_0_c
At Gb sites: outDirR=ave_0_c
At B sites: outDirG=ave_0_c FIG. 16 explains how the averaging operates at each color site. The figure also shows the configuration of the hue calculation in the following subsection. The solid and dotted lines represent averaging and subtraction operation, respectively.

C.1.2.2.1 Hue calculator in the edge direction 0°

$$hue\_0\_lt=i[2][1]-i[1][1] \quad //\text{hue at upper(top)-left}$$

$$hue\_0\_lb=i[2][1]-i[3][1] \quad //\text{hue at lower(bottom)-left}$$

$$hue\_0\_rt=i[2][3]-i[1][3] \quad //\text{hue at upper(top)-right}$$

$$hue\_0\_rb=i[2][3]-i[3][3] \quad //\text{hue at lower(bottom)-right}$$

The hue at the upper-left area also can be calculated as "G−B=(i[2][1]+i[0][1])/2−i[1][1]". This formula is not applied because for example in the case of FIG. 17 the formula takes account the pixel having different color from i[0][1], which tends to result in causing faulty color.

C.1.2.2.2 Hue determiner in the direction along the edge 0°

Hues are calculated at the left and right sides, i.e., hue_0_l and hue_0_r, respectively. The hues are calculated as follows;

$$diff\_0\_t\_i=|i[0][2]-i[2][2]|$$

$$diff\_0\_b\_i=|i[2][2]-i[4][2]|$$

When i[0][2] and i[4][2] are close and the difference is smaller than a threshold (thAveHueSide), hue calculated from the upper, center and lower rows (three rows) on each side are used. In the other cases, hue calculated with the upper or lower row on each side in addition to the center row is used. If diff_0_i<diff_0_b_i, the upper area has closer color than lower one and calculated hue with the upper row is used.

if (|i[0][2]−i[4][2]|<thAveHueSide ) {
  //thAveHueSide=8 for 8 bit-input data works well.
  hue_0_l=hue_v_l
  hue_0_r=hue_v_r
} else if (diff_0_t_i<diff_0_b_i) {
  hue_0_l=hue_0_lt
  hue_0_r=hue_0_rt
} else {
  hue_0_*l*=*hue*_0_lb
  hue_0_r=hue_0_rb
}

For example, the condition (diff_0_t_i<diff_0_b_i) works for the case shown in FIG. 18. In this case, the hue is calculated only from i[2][1], i[3][1], i[2][3] and i[3][3] which have the same color.

C.1.2.2.3 Hue determiner in the direction across the edge 0°

The determiner has a hue blender which blends the hues on the left and right sides. The blending fraction of the left hue increases when the center pixel color is close to the left pixel, and vice versa. The output of the hue blender is blended_0, which is the output of the 2D hue determiner, i.e., that of the hue generator in the edge direction 0°. The inputs of the hue blender (see FIG. 3h) are Hue1, Hue2, DiffSide1 and DiffSide2 and are set as follows;

Hue1=hue_0_l //output of hue determiner in the direction along the edge 0°

Hue2=hue_0_r //output of hue determiner in the direction along the edge 0°

At R and B sites, ave_0_c represents interpolated G at the center pixel and color difference at each side is calculated as follows;

$$DiffSide1=|ave\_0\_c-i[2][1]|$$

$$DiffSide2=|ave\_0\_c-i[2][3]|$$

At Gr and Gb sites, color difference at each side is calculated as follows;

if (diff_0_t_i<diff_0_b_i)

$$DiffSide1=|i[2][2]-i[1][1]|$$

$$DiffSide2=|i[2][2]-i[1][3]|$$

else $$DiffSide1=|i[2][2]-i[3][1]|$$

$$DiffSide2=|i[2][2]-i[3][3]|$$

At Gr and Gb sites, the center pixel is G but the left and right pixels of the center pixel are not G. Then G at the upper row or lower row is also used, which is selected by diff_0_t_i and diff_0_b_i. FIG. 19 shows an example that this selection works effectively.

FIG. 20 illustrates the above color differences (DiffSide1 & 2) calculations. The dotted lines represent absolute of subtraction. "(G)" shows the interpolated G value, i.e., ave_0_c. The differences are calculated by luminance, i.e., G values.

The parameters of the hue blender thA_diffdiff=16, thB_diffdiff=8, thA_side=16 and thB_side=16 work well for 8-bit logic; i.e., the maximum values of diffdiff and diff are 255. And fractionAve=255, fractionAve1=255, and fractionAve2=255 represent 100%. As usual (see FIGS. 14-15), the A refers to a slope parameter and the B refers to an intercept parameter.

C.1.2.2.4 Missing-color calculator with hues (0°)

| | |
|---|---|
| At R sites: outDirB = ave_0_c − blended_0 | //G − (G − B) |
| At Gr sites: outDirR = i[2][2] + blended_0 | //G + (R − G) |
| At Gb sites: outDirB = i[2][2] + blended_0 | //G + (B − G) |
| At B sites: outDirR = ave_0_c − blended_0 | //G − (G − R) |

C.1.2.3 Color generator with hue calculated with interpolated colors (0°)

This type of the color generators is not used for the edge direction 0°.

C.1.3 Interpolator for edge angle 90°

Processing for edge angle 90° is performed in an analogous manner to the interpolator for edge angle 0° and as follows.

C.1.3.1 Color generator by averaging colors in the edge direction (90°)

$$ave\_90\_c = (i[2][1] + i[2][3])/2$$

Figure 21:
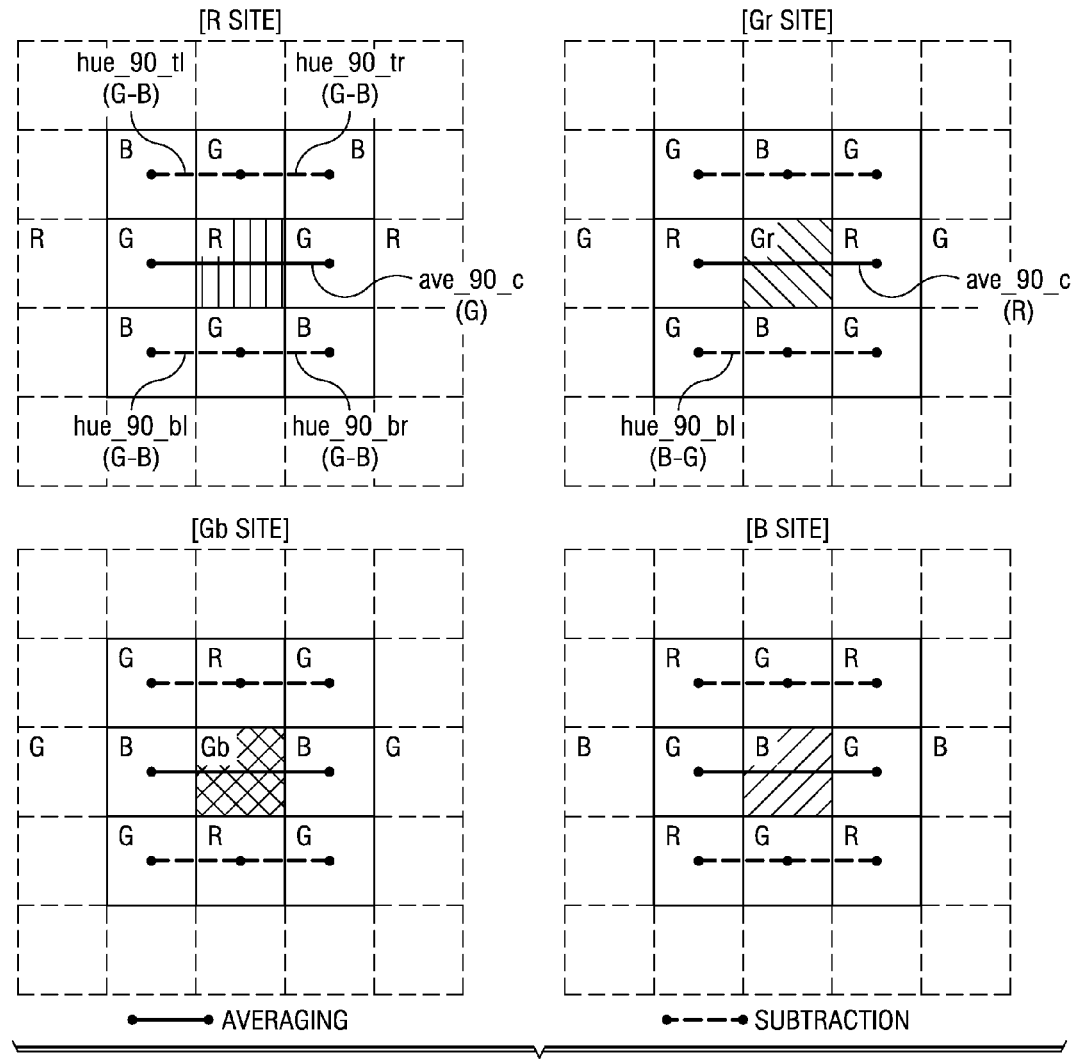

At R sites: outDirG=ave_90_c
At Gr sites: outDirR=ave_90_c
At Gb sites: outDirB=ave_90_c
At B sites: outDirG=ave_90_c FIG. 21 illustrates calculations above and in the following section.

C.1.3.2 Color generator with hues calculated in the edge direction 90°

C.1.3.2.1 Hue calculator in the edge direction 90°

$$hue\_90\_tl = i[1][2] - i[1][1]$$

$$hue\_90\_tr = i[1][2] - i[1][3]$$

$$hue\_90\_bl = i[3][2] - i[3][1]$$

$$hue\_90\_br = i[3][2] - i[3][3]$$

C.1.3.2.2 Hue determiner in the direction along the edge 90°

Hues are calculated at the upper and lower sides, i.e., hue_90_t and hue_90_b, respectively. The hues are calculated as follows;

$$diff\_90\_l\_i = |i[2][0] - i[2][2]|$$

$$diff\_90\_r\_i = |i[2][2] - i[2][4]|$$

if (|i[2][0]−i[2][4]|<thAveHueSide) //thAveHueSide=8 for 8 bit-input-data works well.
  hue_90_t=hue_h_t
  hue_90_b=hue_h_b
} else if (diff_90_l_i<diff_90_r_i) {
  hue_90_t=hue_90_tl
  hue_90_b=hue_90_bl
} else {
  hue_90_t=hue_90_tr
  hue_90_b=hue_90_br
}

C.1.3.2.3 Hue determiner in the direction cross the edge 90°

The hue determiner has a hue blender. The output of the hue blender is blended_90. Inputs of the hue blender are set as follows;
  Hue1=hue_90_t
  Hue2=hue_90_b
  At R or B sites, color difference at each side is calculated as follows;

$$DiffSide1 = |ave\_90\_c - i[1][2]|$$

$$DiffSide2 = |ave\_90\_c - i[3][2]|$$

At Gr or Gb sites, color difference at each side is calculated as follows;
  if (diff_90_l_i<diff_90_r_i)

$$DiffSide1 = |i[2][2] - i[1][1]|$$

$$DiffSide2 = |i[2][2] - i[3][1]|$$

else $$DiffSide1 = |i[2][2] - i[1][3]|$$

$$DiffSide2 = |i[2][2] - i[3][3]|$$

Figure 22:
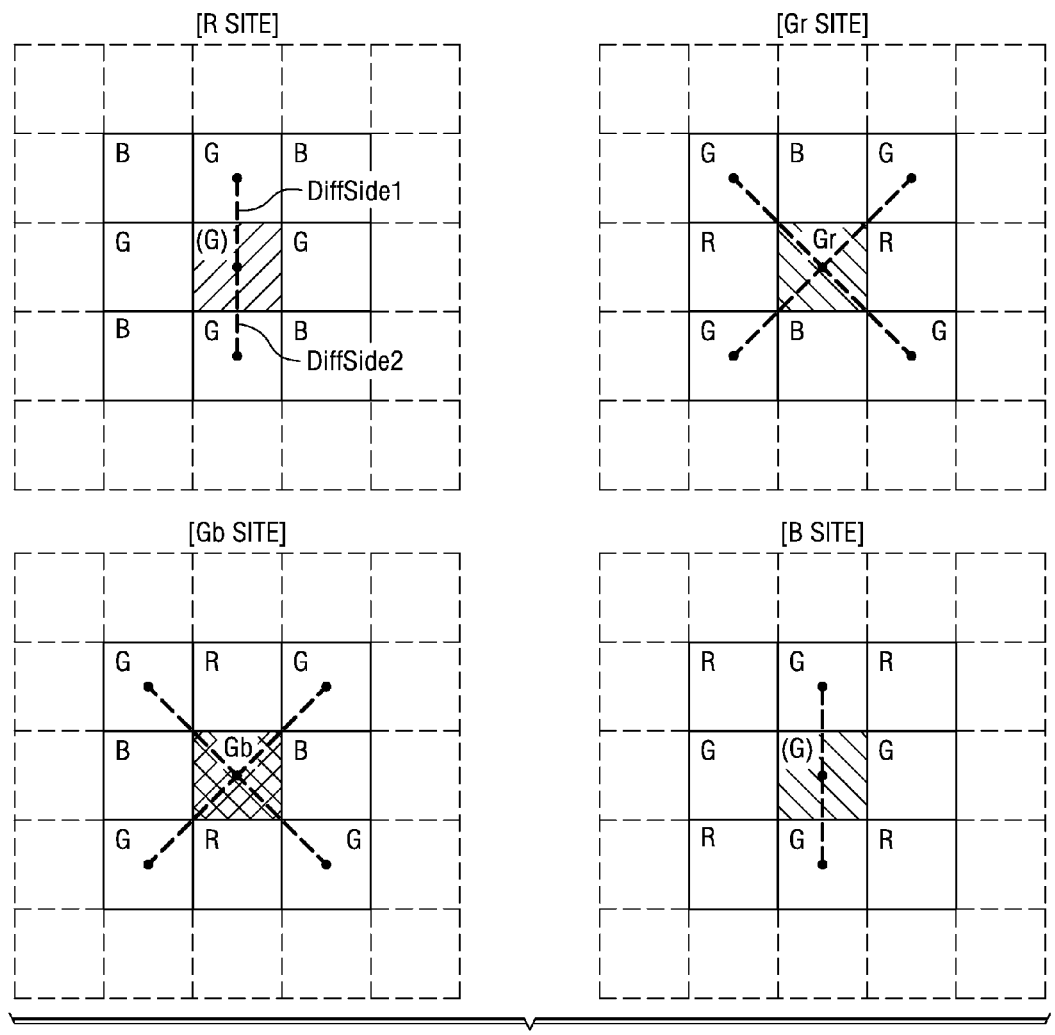

FIG. 22 illustrates these calculations.

The parameters of the hue blender thA_diffdiff=16, thB_diffdiff=8, thA_side=16 and thB_side=16 work well for 8 bit logic. (i.e., the maximum values of diffdiff and diff are 255. fractionAve=255, fractionAve1=255 and fractionAve2=255 represent 100%.)

C.1.3.2.4 Missing-color calculator with hues (90°)

| | |
|---|---|
| At R sites: outDirB = ave_90_c − blended_90 | //G − (G − B) |
| At Gr sites: outDirB = i[2][2] + blended_90 | //G + (B − G) |
| At Gb sites: outDirR = i[2][2] + blended_90 | //G + (R − G) |
| At B sites: outDirR = ave_90_c − blended_90 | //G − (G − R) |

C.1.3.3 Color generator with hue calculated with interpolated colors (90°)

This type of the color generators is not used for the edge direction 90°.

C.1.4 Interpolator for edge angle N45°

The "color generator with hues calculated in the edge direction" and the "color generator with hues calculated with interpolated colors" operate for the angle N45°. The former generator works at Gr and Gb sites and the latter one works at R and B sites.

C.1.4.1 Color generator by averaging colors in the edge direction (N45°)

This type of the color generators is not used for the edge direction N45°.

C.1.4.2 Color generator with hues calculated in the edge direction N45° (at Gr and Gb sites)

At Gr and Gb sites, the "color generator with hues calculated in the edge direction" is used for the N45°0 edge.

C.1.4.2.1 Hue calculator in the edge direction N45° (at Gr and Gb sites)

Figure 23:
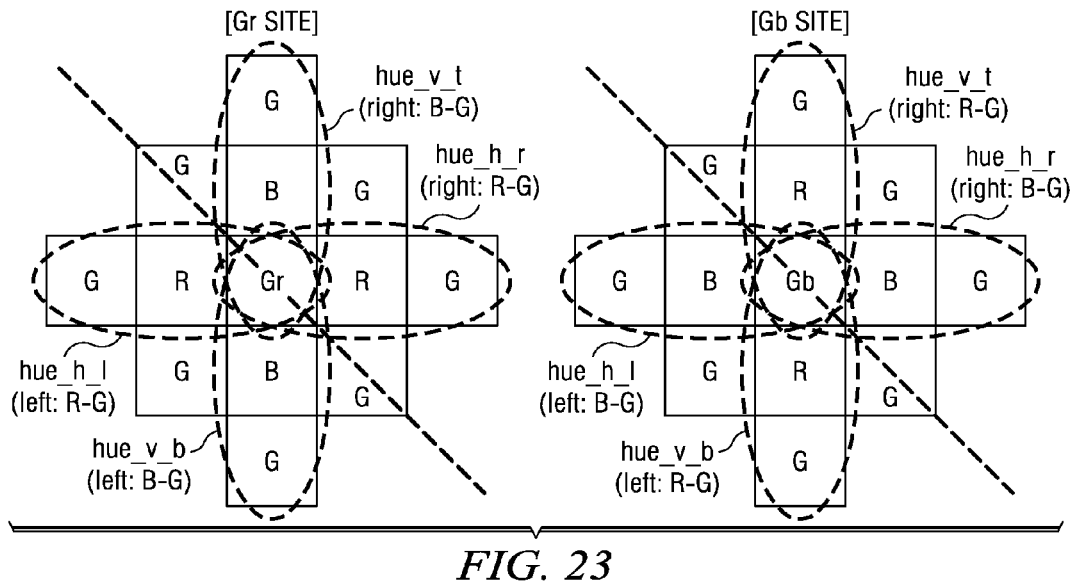

The "hue_h_l", "hue h_r", "hue_v_t" and "hue_v_b" described in the former section are calculated. FIG. 23 shows the configuration of them for the N45° edge.

C.1.4.2.2 Hue determiner in the direction along the edge N45° (at Gr and Gb sites)

This type of the hue determiners is not used for the edge direction N45°.

C.1.4.2.3 Hue determiner in the direction cross the edge N45° (at Gr and Gb sites)

The determiner has two hue blenders (Blender_n45_h and Blender_n45_v) which blend the hues on the left and right sides of the N45° edge. Blender_n45_h and Blender_n45_v blend hue_h_l and hue_h_r and hue_v_t and hue_v_b, respectively. The blending fraction of the left hue increases when the center pixel color is close to the left pixel, and vice versa. The inputs of the hue blenders Hue1, Hue2, DiffSide1 and DiffSide2 are set as follows;

$$diffside\_n45g\_lt = |i[1][1] - i[2][0]|$$

$$diffside\_n45g\_rt = |i[1][1] - i[0][2]|$$

$$diffside\_n45g\_lc = |i[2][2] - i[3][1]|$$

$$diffside\_n45g\_rc = |i[2][2] - i[1][3]|$$

$$diffside\_n45g\_lb = |i[3][3] - i[4][2]|$$

$$diffside\_n45g\_rb = |i[3][3] - i[2][4]|$$

Figure 24:
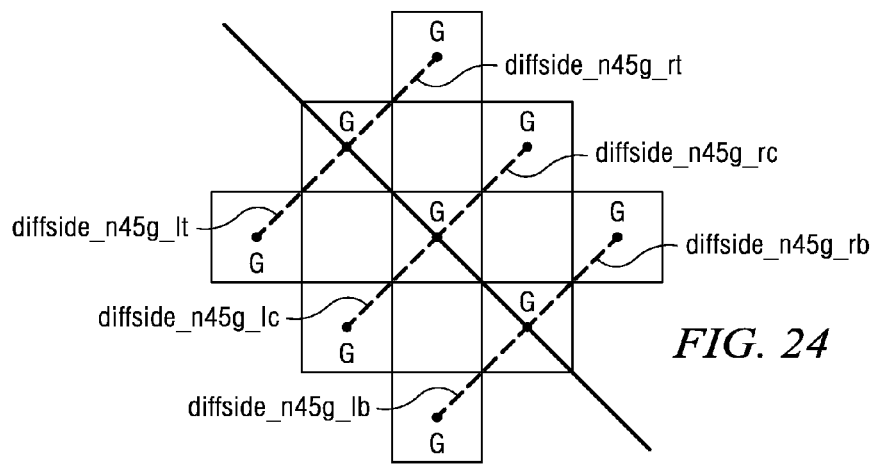

The maximum (largest color-difference) values are chosen as the color difference values (DiffSide1 and DiffSide2) for the two blenders as follows;

DiffSide1=the maximum values of diffside_n45g_lt, diffside_n45g_lc, and diffside_n45g_lb DiffSide2=the maximum values of diffside_n45g_rt, diffside_n45g_rc, and diffside_n45g_rb FIG. 24 shows a pixel configuration for DiffSide1 and 2. The dotted lines represent absolute of subtraction.

Hue inputs for Blender_n45_h are set as follows;
Hue1=hue_h_l
Hue2=hue_h_r
Hue inputs for Blender_n45_v are set as follows;
Hue1=hue_v_b
Hue2=hue_v_t The output of Blender_n45_h and Blender_n45_v are blended_n45_h and blended_n45_v, respectively.

The parameters of the two hue blenders (Blender_n45_h and Blender_n45_v) thA_diffdiff=16, thB_diffdiff=24, thA side=16 and thB_side=8 work well for 8-bit logic; again, the A refers to a slope parameter and B refers to an intercept parameter.

C.1.4.2.4 Missing-color calculator with hues

| | |
|---|---|
| At Gr sites: outDirR = i[2][2] + blended_n45_h | //G + (R − G) |
| outDirB = i[2][2] + blended_n45_v | //G + (B − G) |
| At Gb sites: outDirR = i[2][2] + blended_n45_v | //G + (R − G) |
| outDirB = i[2][2] + blended_n45_h | //G + (B − G) |

C.1.4.3 Color generator with hues calculated with interpolated colors (at R and B sites)

At R and B sites, the "color generator with hues calculated with interpolated colors" is used for N45° edge. At R and B sites, G is missing. Faulty color is sensitive to error of G interpolation. Therefore the two hues (G-R and G-B) are calculated at the identical site. They also calculated with correct (not interpolated) G. For the purposes, interpolated colors at left and right (Green) pixels by the directional interpolator are used.

Figure 25:
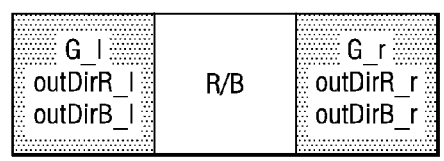
FIG. 25 shows color configuration.

FIG. 25 shows the color configuration. G_l is the left green (i[2][1]). outDirR_l and outDirB_l are the left interpolated R and B by the directional interpolator, respectively. The site of the R/B is the pixel being interpolated (i[2][2]). G_r is the right green (i[2][3]). outDirR_r and outDirB_r is the right interpolated R and B by the directional interpolator, respectively. The interpolated colors (outDirR_l, outDirB_l, outDirR_r and outDirB_r) are read from the buffer in the directional interpolator.

C.1.4.3.1 Hue calculator of neighbors (at R and B sites)

Hues at the left and right neighbor pixels are calculated as follows;

| | |
|---|---|
| outDirGR_r = G_r − outDirR_r | //G-R of the right pixel |
| outDirGB_r = G_r − outDirB_r | //G-B of the right pixel |
| outDirGR_l = G_l − outDirR_l | //G-R of the left pixel |
| outDirGB_l = G_l − outDirB_l | //G-B of the left pixel |

C.1.4.3.2 Hue determiner in the direction cross the edge (at R and B sites)

The determiner has two hue blenders (Blender_n45_GR and Blender_n45_GB). Blender_n45_GR and Blender_n45_GB blend hues outDirGR_l and outDirGR_r and outDirGB_l and outDirGB_r, respectively. The blending fraction of the left hue increases when the center pixel color is close to the left pixel, and vice versa.

Color differences (DiffSide1 and DiffSide2) for the two blenders are calculated as follows;

At R sites:

$diffside\_n45rb\_hl=|i[2][2]-\text{outDir}R\_l|$ $diffside\_n45rb\_hr=|i[2][2]-\text{outDir}R\_r|$ $diffside\_n45rb\_vl=|i[1][1]-\text{outDir}B\_l|$ $diffside\_n45rb\_vr=|i[3][3]-\text{outDir}B\_r|$ At B sites:

diffside_$n45rb\_hl=|i[2][2]-\text{outDir}B\_l|$ diffside_$n45rb\_hr=|i[2][2]-\text{outDir}B\_r|$ diffside_$n45rb\_vi=|i[1][1]-\text{outDir}R\_|$ diffside_$n45rb\_vr=|i[3][3]-\text{outDir}R\_r|$ DiffSide1=larger value of "diffside_n45rb_hl" and "diffside_n45rb_vl"

DiffSide2=larger value of "diffside_n45rb_hr" and "diffside_n45rb_vr"

Figure 26:
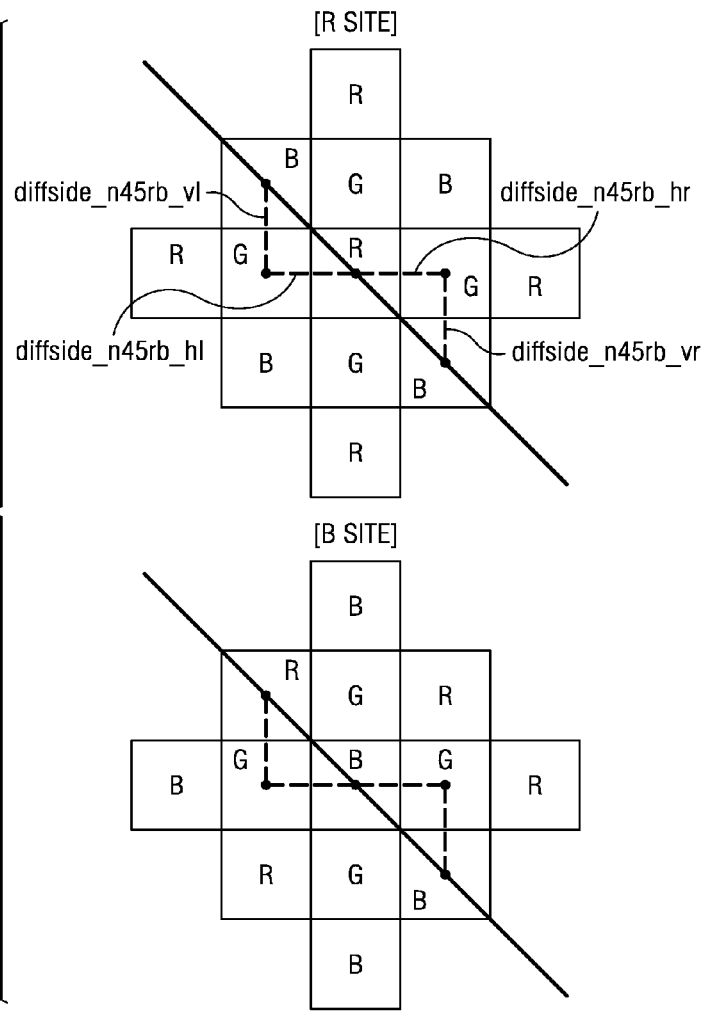
FIGS. 26-29 show pixels in calculations.

FIG. 26 shows the pixel configuration for the calculation.

Inputs for Blender_n45_GR are set as follows;
Hue1=outDirGR_l
Hue2=outDirGR_r

Inputs for Blender_n45_GB are set as follows;
Hue1=outDirGB_l
Hue2=outDirGB_r

The output of Blender_n45_GR and Blender_n45_GB are outDirGR and outDirGB, respectively.

The parameters of the two hue blenders thA_diffdiff=16, thB_diffdiff=8, thA_side=16 and thB_side=16 work well for 8 bit logic.

C.1.4.3.3 Missing-color calculator with hues (at R and B sites)

| | |
|---|---|
| At R sites: outDirG = i[2][2] + outDirGR | //R + (G − R) |
| outDirB = outDirG − outDirGB | //G − (G − B) |
| At B sites: outDirG = i[2][2] + outDirGB | //B + (G − B) |
| outDirR = outDirG − outDirGR | //G − (G − R) |

C.1.5 Interpolator for edge angle P45°

Processing is done in an analogous manner to the interpolator for edge angle P45°.

C.1.5.1 Color generator by averaging colors in the edge direction (P45°)

This type of the color generators is not used for the edge direction P45°.

C.1.5.2 Color generator with hues calculated in the edge direction P45°(at Gr and Gb sites)

Figure 27:
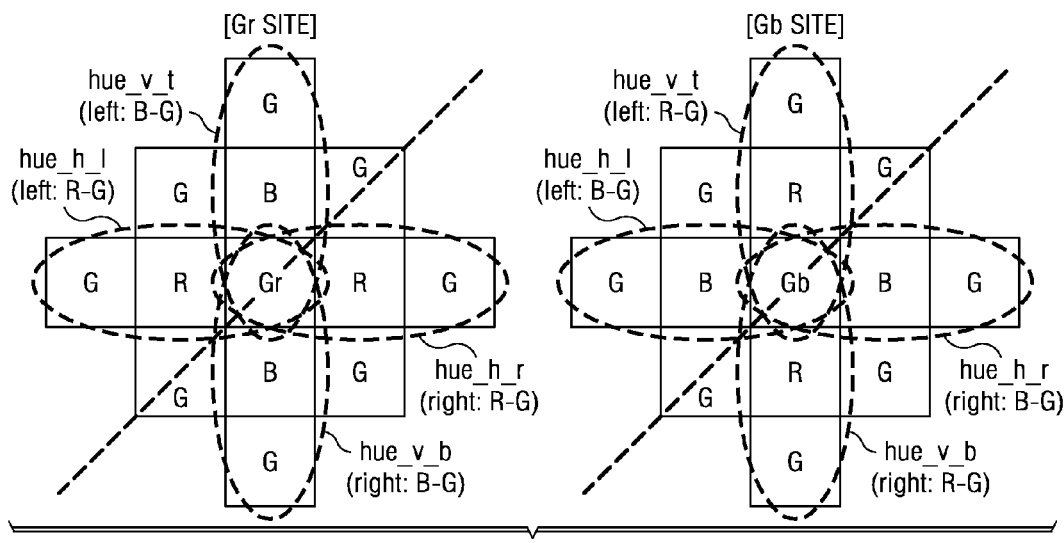
Figure 28:
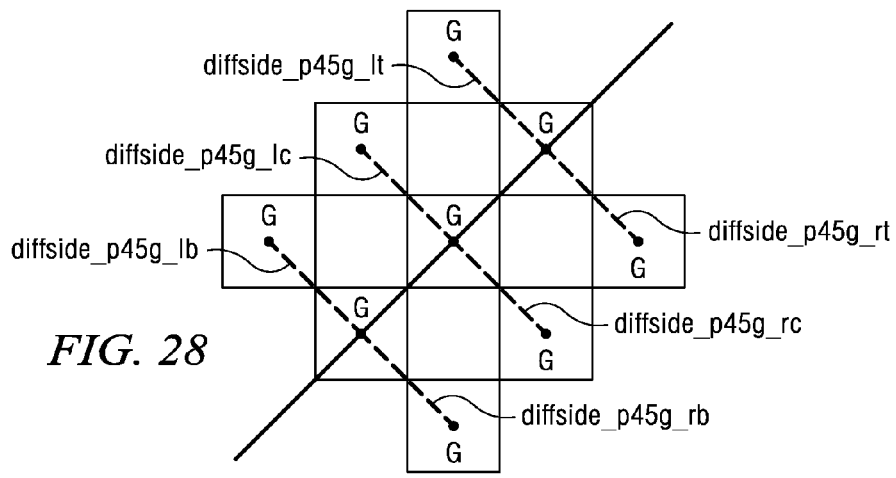

C.1.5.2.1 Hue calculator in the edge direction P45°(at Gr and Gb sites) "hue_h_l", "hue_h_r", "hue_v_b" and "hue_v_t" described in the former section are calculated. FIG. 27 shows the configuration of them for the P45° edge.

C.1.5.2.2 Hue determiner in the direction along the edge P45°(at Gr and Gb sites)

This type of the hue determiners is not used for the edge direction P45°.

C.1.5.2.3 Hue determiner in the direction cross the edge P45° (at Gr and Gb sites)

The determiner has two hue blenders (Blender_p45_h and Blender_p45_v) which blend the hues on the left and right sides of the P45° edge. Blender_p45_h and Blender_p45_v blend hue_h_l and hue_h_r and hue_v_t and hue_v_b, respectively. The inputs of the hue blenders Hue1, Hue2, DiffSide1 and DiffSide2 are set as follows;

$$diffside\_p45g\_lt=|i[1][3]-i[0][2]|$$

$$diffside\_p45g\_rt=|i[1][3]-i[2][4]|$$

$$diffside\_p45g\_lc=|i[2][2]-i[1][1]|$$

$$diffside\_p45g\_rc=|i[2][2]-i[3][3]|$$

$$diffside\_p45g\_lb=|i[3][1]-i[2][0]|$$

$$diffside\_p45g\_rb=|i[3][1]-i[4][2]|$$

Color difference values (DiffSide1 and DiffSide2) for the two blenders are

DiffSide1=the maximum value of diffside_p45g_lt, diffside_p45g_lc, and diffside_p45g_lb DiffSide2=the maximum value of diffside_p45g_rt, diffside_p45g_rc, and diffside_p45g_rb

FIG. 28.

Hue inputs for Blender_p45_h are set as follows;
Hue1=hue_h_l
Hue2=hue_h_r

Hue inputs for Blender_p45_v are set as follows;
Hue1=hue_v_t
Hue2=hue_v_b

The output of Blender_p45_h and Blender_p45_v are blended_p45_h and blended_p45_v, respectively.

The parameters of the two hue blenders (Blender_p45_v and Blender_p45_h) thA_diffdiff=16, thB_diffdiff=24, thA_side=16 and thB_side=8 work well for 8 bit logic.

C.1.5.2.4 Missing-color calculator with hues

| | |
|---|---|
| At Gr sites: outDirR = i[2][2] + blended_p45_h | //G + (R − G) |
| outDirB = i[2][2] + blended_p45_v | //G + (B − G) |
| At Gb sites: outDirR = i[2][2] + blended_p45_v | //G + (R − G) |
| outDirB = i[2][2] + blended_p45_h | //G + (B − G) |

C.1.5.3 Color generator with hues calculated with interpolated colors (at R and B sites)

Processing is done in an analogous manner to the color generator for N45° edge at R and B sites.

C.1.5.3.1 Hue calculator of neighbors (at R and B sites)

The same calculation is performed with N45° edge at R and B sites.

C.1.5.3.2 Hue determiner in the direction cross the edge (at R and B sites)

The determiner has two hue blenders (Blender_p45_GR and Blender_p45_GB). Color differences (DiffSide1 and DiffSide2) for the two blenders are calculated as follows;

At R sites:

$$diffside\_p45rb\_hl=|i[2][2]-outDirR\_l|$$

$$diffside\_p45rb\_hr=|i[2][2]-outDirR\_r|$$

$$diffside\_p45rb\_vl=|i[3][1]-outDirB\_l|$$

$$diffside\_p45rb\_vr=|i[1][3]-outDirB\_r|$$

At B sites:

$$diffside\_p45rb\_hl=|i[2][2]-outDirB\_l|$$

$$diffside\_p45rb\_hr=|i[2][2]-outDirB\_r|$$

$$diffside\_p45rb\_vl=|i[3][1]-outDirR\_l|$$

$$diffside\_p45rb\_vr=|i[1][3]-outDirR\_r|$$

DiffSide1=larger value of "diffside_p45rb_hl" and "diffside_p45rb_vl"

DiffSide2=larger value of "diffside_p45rb_hr" and "diffside_p45rb_vr"

Figure 29:
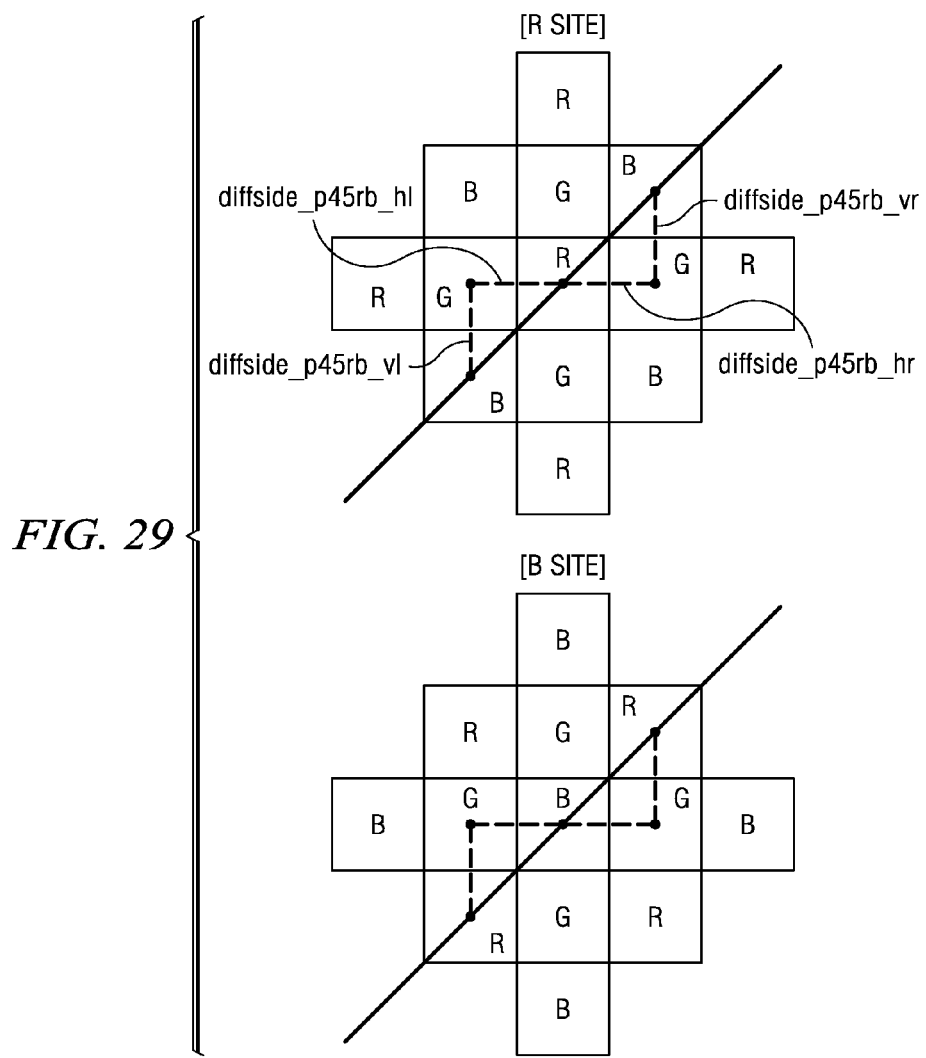

FIG. 29 shows the pixel configuration for the calculation.

Inputs for Blender_p45_GR are set as follows;
Hue1=outDirGR_l
Hue2=outDirGR_r

Inputs for Blender_p45_GB are set as follows;
Hue1=outDirGB_l
Hue2=outDirGB_r

The output of Blender_p45_GR and Blender_p45_GB are outDirGR and outDirGB, respectively.

The parameters of the two hue blenders thA_diffdiff=16, thB_diffdiff=8, thA_side=16 and thB_side=16 work well for 8 bit logic.

C.1.4.3.3 Missing-color calculator with hues (at R and B sites)

The same calculation is performed with N45°edge at R and B sites.

C.2 Non-directional interpolator

The outputs of the non-directional missing-color calculator, i.e., that of the non-directional interpolator are interpolated R (outFineR), interpolated G (outFineG) and interpolated B (outFineB) and two of the three colors are output for a pixel site because one of the three colors does not need to be interpolated or generated.

At Gr and Gb sites, the "color generator with hues calculated averaged colors" is used. The missing colors are obtained by averaging input data (original color values) to get missing color values, calculating hues around the center pixel with the averaged and original colors, and averaging the hues to get non-directional hues.

At R and B sites, the "color generator with hues calculated with interpolated colors" is used. At R and B sites, G is missing. Faulty color is sensitive to error of G interpolation. Therefore the two hues (G-R and G-B) are calculated at the identical site. They also calculated with correct (not interpolated) G. For the purposes, interpolated colors at left and right (Green) pixels by the non-directional interpolator are used.

C.2.1 At R and B sites

At R and B sites, the "color generator with hues calculated with interpolated colors" is used. FIG. 30 shows the color configuration. G_l is the left green (i[2][1]). outFineR_l and outFineB_l are the left interpolated R and B by the non-directional interpolator, respectively. The site of R/B is the pixel being interpolated (i[2][2]). G_r is the right green (i[2][3]). outFineR_r and outFineB_r is the right interpolated R and B by the non-directional interpolator, respectively. The interpolated colors (outFineR_l, outFineB_l, outFineR_r and outFineB_r) are stored in the buffer in the non-directional interpolator.

C.2.1.1 Hue calculator of neighbors

Hues on the left and right sides are calculated after missing color of the left and right pixels are calculated.

| | |
|---|---|
| outFineGR_r = G_r − outFineR_r | //G-R of the right pixel |
| outFineGR_l = G_l − outFineR_l | //G-R of the left pixel |
| outFineGB_r = G_r − outFineB_r | //G-B of the right pixel |
| outFineGB_l = G_l − outFineB_l | //G-B of the left pixel |

C.2.1.2 Non-directional hue determiner

Hues on the left and right sides are averaged as follows,

| | |
|---|---|
| outFineGR = (outFineGR_r + outFineGR_l) / 2 | //averaged G-R |
| outFineGB = (outFineGB_r + outFineGB_l) / 2 | //averaged G-B |

C.2.1.3 Missing-color calculator with hues

Missing colors are calculated with the hues as follows;

| | |
|---|---|
| At R sites: outFineG = i[2][2] + outFineGR | //R + (G − R) |
| outFineB = outFineG − outFineGB | //G − (G − B) |
| At B sites: outFineG = i[2][2] + outFineGB | //B + (G − B) |
| outFineR = outFineG − outFineGR | //G − (G − R) |

C.2.2 At Gr and Gb sites

At Gr and Gb sites, the "color generator with hues calculated with averaged colors" is used.

C.2.2.1 Hue calculator using averaged colors

Center pixel value is used to calculate hue because the center position has right value for G.

hue_v_t, hue_v_b, hue_h_l and hue-h_r shown in the former section are calculated. FIG. 31 illustrates the color configuration for the Gr and Gb site.

C.2.2.2 Non-directional hue determiner

To calculate missing color non-directionally, hues around the center pixel are averaged as follows;

hue_v_tb=(hue_v_t+hue_v_b)/2 hue_h_lr=(hue_h_l+hue_h_r)/2

At Gr sites, "hue_v_tb" and "hue_h_lr" correspond to the hue "B-G" and "R-G", respectively.

At Gb sites, "hue_v_tb" and "hue_h_lr" correspond to the hue "R-G" and "B-G", respectively.

C.2.2.3 Missing-color calculator with hues

"outFineR" and "outFineB" are calculated with the hues as follows;

| | |
|---|---|
| At Gr sites: outFineR = i[2][2] + hue_h_lr | //G + (R − G) |
| outFineB = i[2][2] + hue_v_tb | //G + (B − G) |

-continued

| | |
|---|---|
| At Gb sites: outFineB = i[2][2] + hue_h_lr | //G + (B − G) |
| outFineR = i[2][2] + hue_v_tb | //G + (R − G) |

C.3 Directivity controlling blender

The outputs of the directional and non-directional interpolator are blended to control the directivity.

out$R$=outDir$R$*(100-fractionFine$LPF$)/100+ outFine$R$*fractionFine$LPF$/100 out$G$=outDir$G$*(100-fractionFine$LPF$)/100+ outFine$G$*fractionFine$LPF$/100 out$B$=outDir$B$*(100-fractionFine$LPF$)/100+ outFine$B$*fractionFine$LPF$/100 where the unit of the fractionFine is %. Only two of the above three calculations are performed for a pixel site because only two of three colors need to be interpolated, the original color of the pixel is the third color.

4. Modifications

The preferred embodiments can be modified in various ways while retaining the blending of directional and non-directional interpolations.

For example, the Bayer pattern could be replaced with other mosaic patterns such as complementary colors, the number of edge directions could be increased or decreased, the various thresholds, slopes, and intercepts could be varied, and so forth. Also, the demosaicing block can omit the directional LPF. Instead of the 2D hue determiner, use a one-dimensional (1D) hue determiner which consists of a hue determiner in the direction across the edge.

In the A.1.1.2.1 section,
if (diff_0_t<diff_0_b)

*diff[1]=diff_0_c+diff_0_t* else

*diff[1]=diff_0_c+diff_0_b*

In the A.1.2.2.1 section,
if (diff_90_l<diff_90_r)

*diff[3]=diff_90_c+diff_90_l* else

*diff[3]=diff_90_c+diff_90_r*

In the A.1.3.2.1 section,
if (is_dir_n45t=true)

*diff[0]=(diff_n45rb_c+diff_n45rb_t+diff_n45rb_l+diff_n45rb_r)/2* else

*diff[0]=(diff_n45rb_c+diff_n45rb_b+diff_n45rb_l+diff_n45rb_r)/2*

In the A.1.4.2.1 section,
if (is_dir_p45t=true)

*diff[2]=(*

*diff_p45rb_c+diff_p45rb_t+diff_p45rb_l+diff_p45rb_r)/2* else

*diff[2]=(*

*diff_p45rb_c+diff_p45rb_b+diff_p45rb_l+diff_p45rb_r)/2*

What is claimed is:

1. A method of a digital signal processor of color filter array image demosaicing, comprising the steps of:
   (a) receiving an input color filter array image with a color value of one of a plurality of colors for each pixel of said input image;
   (b) detecting an edge direction for a pixel of said input image;
   (c) interpolating in said digital signal processor at said pixel according to said edge direction at said pixel, said interpolating for each color of said plurality of colors except for a color corresponding to the color value of said pixel in said input image, said interpolating generating an output image;
   (d) wherein said detecting an edge direction includes low-pass-filtering an initial edge direction detected for said pixel plus edge direction detections for other pixels of said input image.

2. The method of claim 1, wherein said low-pass-filtering uses an edge direction detected for a pixel to the right of said pixel plus uses an edge direction detected for each of two pixels to the left of said pixel, where left to right is interpreted as scan order for pixels in said input image.

3. The method of claim 2, wherein when said edge direction detected for a pixel to the right of said pixel and said edge direction detected for each of two pixels to the left of said pixel are all equal to a first direction and said initial edge direction detected for said pixel is perpendicular to said first direction, said low-pass-filtering replaces said initial edge direction detected with said first direction.

4. A method a digital signal processor of color filter array image demosaicing, comprising the steps of:
   (a) receiving an input color filter array image with a color value of one of a plurality of colors for each pixel of said input image;
   (b) detecting an edge direction for a pixel of said input image;
   (c) interpolating in said digital processor at said pixel according to said edge direction at said pixel, said interpolating for each color of said plurality of colors except for a color corresponding to the color value of said pixel in said input image, said interpolating generating an output image;
   (d) wherein said detecting an edge direction includes (i) computing a directional index for each edge angle of a plurality of edge angles and (ii) selecting the most probable edge angle by using said computed directional indexes.

5. The method of claim 4, wherein said computing a directional index for an edge angle includes for each pair of pixels of a plurality of pairs of pixels where each of said pairs consists of two pixels with color values for the same color and which have locations corresponding to said edge angle, computing a difference of color values of said two pixels of said pair.

6. The method of claim 5, wherein the plurality of edge angles consists of angles which are multiples of 45 degrees relative to the rows and columns of pixels of said color filter array.

7. A method of a digital signal processor of color filter array image demosaicing, comprising the steps of:
   (a) receiving an input color filter array image with a color value of one of a plurality of colors for each pixel of said input image;
   (b) detecting an edge direction for a pixel of said input image;
   (c) interpolating in said digital signal processor at said pixel according to said edge direction at said pixel, said interpolating for each color of said plurality of colors except for a color corresponding to the color value of said pixel in said input image, said interpolating generating an output image;
   (d) wherein said interpolating includes blending the outputs of a directional interpolation and a non-directional interpolations at said pixel.

8. The method of claim 7, wherein said blending adjusts the fraction of said output of directional interpolation and said output of non-directional interpolation according to minimum color differences of pairs of pixels about said pixel.

9. A color filter array image interpolator, comprising:
   (a) an edge detector including an output lowpass filter;
   (b) a directional interpolator coupled to said edge detector;
   (c) a non-directional interpolator; and
   (d) a blender coupled to said directional interpolator and to said non-directional interpolator, said blender including a blending fraction generator.

10. The color filter array image interpolator of claim 9, wherein said edge detector, said directional interpolator, said non-directional interpolator, and said blender are implemented as a program on a programmable processor.

* * * * *

UNITED STATES PATENT AND TRADEMARK OFFICE
CERTIFICATE OF CORRECTION

PATENT NO. : 7,653,240 B1  Page 1 of 1
APPLICATION NO. : 11/379654
DATED : January 26, 2010
INVENTOR(S) : Otobe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 950 days.

Signed and Sealed this

Twenty-eighth Day of December, 2010

David J. Kappos
*Director of the United States Patent and Trademark Office*